(12) United States Patent
Higuchi et al.

(10) Patent No.: US 10,117,437 B2
(45) Date of Patent: Nov. 6, 2018

(54) FOOD DOUGH ROUNDING DEVICE AND ROUNDING METHOD

(71) Applicant: Rheon Automatic Machinery Co., Ltd., Utsunomiya-shi, Tochigi (JP)

(72) Inventors: Katsumichi Higuchi, Utsunomiya (JP); Shoji Machida, Utsunomiya (JP)

(73) Assignee: RHEON AUTOMATIC MACHINERY CO., LTD., Tochigi (JP)

( * ) Notice: Subject to any disclaimer, the term of this patent is extended or adjusted under 35 U.S.C. 154(b) by 206 days.

(21) Appl. No.: 15/100,236

(22) PCT Filed: Sep. 24, 2014

(86) PCT No.: PCT/JP2014/075229
§ 371 (c)(1),
(2) Date: May 27, 2016

(87) PCT Pub. No.: WO2015/079793
PCT Pub. Date: Jun. 4, 2015

(65) Prior Publication Data
US 2018/0199579 A1    Jul. 19, 2018

(30) Foreign Application Priority Data

Nov. 29, 2013  (JP) .................................. 2013-248410
Sep. 16, 2014  (JP) .................................. 2014-187790

(51) Int. Cl.
*A21C 7/02* (2006.01)
*A21C 7/01* (2006.01)
*A21C 11/00* (2006.01)
*A21C 9/08* (2006.01)

(52) U.S. Cl.
CPC .................. *A21C 7/01* (2013.01); *A21C 9/08* (2013.01); *A21C 11/00* (2013.01)

(58) Field of Classification Search
CPC ................ A21C 7/00; A21C 7/02; A21C 7/04
See application file for complete search history.

(56) References Cited

U.S. PATENT DOCUMENTS

| 4,008,025 A | 2/1977 | Campbell |
| 4,008,425 A | 2/1977 | Campbell |
| 4,025,273 A | 5/1977 | Mauer et al. |
| 4,124,305 A | 11/1978 | Benier |

(Continued)

FOREIGN PATENT DOCUMENTS

| JP | 6337827 | 10/1988 |
| JP | 6337830 | 10/1988 |
| JP | 6337834 | 10/1988 |

(Continued)

*Primary Examiner* — James Sanders
(74) *Attorney, Agent, or Firm* — Myers Andras LLP; Joseph C. Andras

(57) ABSTRACT

Provided is a rounding device that rounds a food dough using a pair of shaping plates (11, 13), the device being provided with the following: a conveying device (9) that conveys a food dough (7); and the pair of shaping plates (11, 13) disposed on the upper surface of the conveying device (9) so as to extend along the conveying direction (R) of the conveying device. The rounding device is characterized in that at least one of the pair of shaping plates (11, 13) has recessed holding-dough parts (17, 21).

3 Claims, 15 Drawing Sheets

(56) References Cited

U.S. PATENT DOCUMENTS 5,786,016 A * 7/1998 Campbell ................ A21C 7/01
                                                                                                425/332

FOREIGN PATENT DOCUMENTS

| JP | 418383 | 4/1992 |
| JP | 2000116307 | 4/2000 |
| JP | 201454237 | 3/2014 |
| WO | 93-13667 | 7/1993 |
| WO | 2013183423 | 12/2013 |

* cited by examiner

FOOD DOUGH ROUNDING DEVICE AND ROUNDING METHOD

CROSS-REFERENCES TO RELATED APPLICATIONS

This application claims the benefits of the priorities of Japanese Patent Application No. 2013-248410, filed Nov. 29, 2013, and Japanese Patent Application No. 2014-187790, filed Sep. 16, 2014. All their disclosures are incorporated herein by reference to them.

TECHNICAL FIELD

The present invention relates to a technique for rounding pieces of food dough, and, in particular, relates to a machine and a process of rounding the food-dough pieces with a pair of opposing shaping plates.

BACKGROUND

In a process for manufacturing rounded pieces of food dough having a viscosity, as, for instance, that of bread dough, a sequence in which kneaded food dough is divided into predetermined quantities, and then each divided food-dough piece is rounded, is proposed. The food-dough pieces such as the bread dough fed from a rounding machine is manually divided into predetermined quantities or divided by any well-known divider. As for the divided food-dough pieces, the shapes are uneven, and the cutting surfaces have an adhesiveness, and thus firmer skin is not formed.

The purposes of the rounding process are equalizing the food-dough pieces in a specific shape, forming firmer skins of the food-dough pieces, equalizing inner layers of the food-dough pieces, and so on. To round the food-dough pieces, it is known that the rounding process can be efficiently performed by dispersing projections and corners on the surfaces of the food-dough pieces in an early stage to round the food-dough pieces such that each entire piece forms a roundish shape and thereafter forms a uniform shape with a firm skin.

Conventionally, there is a rounding machine that is provided with a pair of movable guiding plates in which the respective plates are opposed to each other, such that they approach, and retract from, each other, above a base or above a conveying platform (a conveying device) for supporting and conveying divided food-dough pieces. In this machine, while the respective food-dough pieces are pressed between the opposed guiding plates when they are close to each other, the dough pieces are rolled horizontally on the conveying surface and rounded by having the guiding plates swing in opposite directions, as is, for instance, disclosed in Patent Literature 1 and 2.

Further, in this conventional rounding machine, the paired guiding plates are positioned to incline outwardly from the lower side to the upper side thereof such that the distance between the opposed guiding plates is narrower at the lower side and wider at the upper side. For the respective guiding plates, the angle of installation therebetween and the distance between the installation points can be adjusted such that an angle therebetween may be smaller when the predetermined quantity of each divided dough piece is smaller, while it may be larger when the predetermined quantity of each divided dough piece is larger.

PRIOR-ART PUBLICATIONS

Patent Literature

Patent Literature 1: Japanese Utility Model Publication No. S63 [1988]-37827
Patent Literature 2: Japanese Utility Model Publication No. H04 [1992]-18383

SUMMARY OF THE INVENTION

Problems to be Addressed by the Invention

When the food-dough pieces are rounded by the rounding machine, they may adhere to the machine depending on their properties. This problem often occurs, in particular, with what is generically called artisan bread, which is a traditional bread preferred in Europe. Artisan bread includes a coarse cereal such as rye at a relatively high rate, as well as wheat, and thus the gluten content in it is relatively low, to reduce elasticity. Because such a dough piece may adhere to the machine when it is formed by it, its handling is difficult. In particular, a large and heavy dough piece may often adhere to the machine. If the food-dough pieces adhere to the machine, the problem of a predetermined rounding effect being insufficient and a lack of a uniform shape of the respective food-dough-pieces may occur.

The rounding machine as recited in Patent Literature 1 and 2 also involves the above problem of the adherence. Although the rounding machine as recited in Patent Literature 1 and 2 rounds the food-dough pieces by horizontally rolling them, the horizontal rolling of the food-dough pieces is caused by a frictional force between the guiding plates and the surfaces of the food-dough pieces. If a less elastic and heavy dough piece such as a piece of artisan bread is repeatedly pressed on the inclined guide plates, it will likely adhere because of friction. If the food-dough piece adheres to the guiding plate, problems such as damage to the food-dough piece, a wrong shape of the food-dough piece, and a stagnant food-dough piece, on the conveying device occur.

Further, the rounding machine as recited in Patent Literature 1 and 2 involves a problem in which the same portion of the food-dough piece is repeatedly pressed and kneaded by the movable guiding plates such that the respective plates are opposed to each other such that they approach, and retract from, each other. For a less elastic and heavy food-dough piece, the guide plates that are immediately retracted from each other after they approach each other have insufficient frictional force such that they cannot roll the food-dough piece. In the rounding machines as recited in Patent Literature 1 and 2, because forming faces that are each inclined at a constant angle over the length of each guiding plate round the food-dough pieces, the same portions of the food-dough piece are pressed and kneaded in the entire rounding processes unless the food-dough pieces are rolled. This results in incorrect shapes of the food-dough pieces and uneven firm skins of the pieces. In a fermented dough piece such as a bread-dough piece, because residual air-bubbles within the dough are not uniformly distributed, the inner layer of a product after a heating process become uneven. Such a kneading problem may more frequently occur when powder and so on diffuses on the food-dough piece to prevent the above adhering problem.

Means to Solve the Problems

One aspect of the present disclosure provides a rounding machine for rounding food-dough pieces. The rounding machine comprises a conveying device for conveying a food-dough piece and a pair of shaping plates that are arranged above the conveying device such that they extend along the conveying direction of the conveying device. The machine is characterized in that at least one of the shaping plates includes a dough-holding section that is provided with a concave forming face on the inside that is opposite to the other shaping plate.

One aspect of the present disclosure provides the above rounding machine that is characterized in that the machine is provided with a plurality of the dough-holding sections along the conveying direction.

One aspect of the present disclosure provides the above rounding machine that is characterized in that at least one dough-holding section includes a protruding section that inwardly protrudes from the lower part of the corresponding concave face and/or the forming face of the dough-holding section is provided with an inclined face that is outwardly inclined from the lower side to the upper side.

One aspect of the present disclosure provides the above rounding machine that is characterized in that the upstream dough-holding section of the plurality of dough-holding sections includes a protruding section that inwardly protrudes from the lower portion of the corresponding forming face, while the forming face of the downstream dough-holding section has an inclined face that is outwardly inclined from its lower side to its upper side.

One aspect of the present disclosure provides the above rounding machine that is characterized in that the upstream dough-holding section of the plurality of dough-holding sections has an inclined face that is outwardly inclined from its lower side to its upper side, while the forming face of the downstream dough-holding section has at least a protruding section that inwardly protrudes from the lower portion of the corresponding forming face.

One aspect of the present disclosure provides the above rounding machine that is characterized in that the pair of the shaping plates is movable along a moving locus. The moving locus has a longitudinal component in which the shaping plates are moved relatively in opposite directions along the longitudinal direction and a width component in which the shaping plates move relatively to approach, and retract from, each other, and along the widthwise direction perpendicular to the longitudinal direction, wherein the stroke of the moving of the longitudinal component is longer than that of the width component.

One aspect of the present disclosure provides the above rounding machine that is characterized in that the moving locus includes a substantially oval path and/or the longitudinal component of the moving locus includes a substantially linear component and/or the longitudinal component of the moving locus includes a non-linear component and/or the longitudinal component of the moving locus includes a substantially arc-like component.

One aspect of the present disclosure provides the above rounding machine that is characterized in that the machine further comprises a pushing-down member that is moved vertically between the pair of shaping plates.

One aspect of the present disclosure provides the above rounding machine that is characterized in that the pressing-down member is lowered between the shaping plates when the shaping plates retract from each other, while the pressing-down member is moved up when the shaping plates approach each other.

One aspect of the present disclosure provides the above rounding machine that is characterized in that the pushing-dough member is a belt conveyor running in the direction of the conveying device, wherein the velocity that the conveyor belt travels is the same as that of the conveying device.

Another aspect of the present disclosure provides a process of rounding food-dough pieces by moving a pair of shaping plates along a moving locus. The pair of shaping plates is arranged and extend along the conveying direction of the food-dough pieces and at least one of the shaping plates is provided with a concave forming face on the inside that is opposite the other shaping plate. The process is characterized in that the process comprises the following steps:

(a) laterally pressing and holding the food-dough pieces on a conveying device by causing the shaping plates to approach each other;

(b) rounding the food-dough pieces by moving the shaping plates that are opposite each other along the conveying direction during or after the approaching motion of the shaping plates takes place;

(c) releasing the food-dough pieces by retracting the shaping plates from each other during or after the rounding process after the approaching motions of the shaping plates takes place; and (d) carrying out the above steps (a), (b), and (c) one or more times. Another aspect of the present disclosure also provides the above process that is characterized in that in at least the above step (b) the shaping face facilitates the rolling motion of the food-dough pieces in the horizontal direction.

Another aspect of the present disclosure provides the above process of rounding food-dough pieces that is characterized in that the moving locus of the shaping plates has a longitudinal component in which the shaping plates are moved relatively in directions opposite to each other, along the conveying direction, and a width component in which the shaping plates move relatively to approach, and retract from, each other, along the widthwise direction perpendicular to the conveying direction, and wherein the moving stroke of the longitudinal component is longer than that of the width component when the food-dough pieces are rounded.

The Advantages of the Invention

With the present invention, in rounding the food-dough piece, in particular an adhesive dough piece, can be rounded to prevent an adhesion while the dough-piece is rolled in the horizontal direction. Thus, the present invention can provide a rounded dough piece with an even and firm surface without damage to the food-dough piece. Further, the present invention can provide a rounded food-dough piece to cause gases to form therefrom, and having uniform inner layers.

BRIEF DESCRIPTION OF THE DRAWINGS

The accompanying drawings, which are incorporated in and constitute a part of the specification, schematically illustrate the preferred embodiment of the present invention, and together with the general description given above and the detailed description of the preferred embodiment given below serve to explain the principles of the present invention.

FIG. 8(A) is a drawing as viewed along the arrow A-A in FIG. 6. FIG. 8(B) is a drawing as viewed along the arrow B-B in FIG. 6.

FIGS. 11(A) and (B) are drawings as viewed along the arrow D-D in FIG. 10, wherein the intervals between the opposed shaping plates are different.

EMBODIMENTS TO CARRY OUT THE INVENTION

Figure 1:
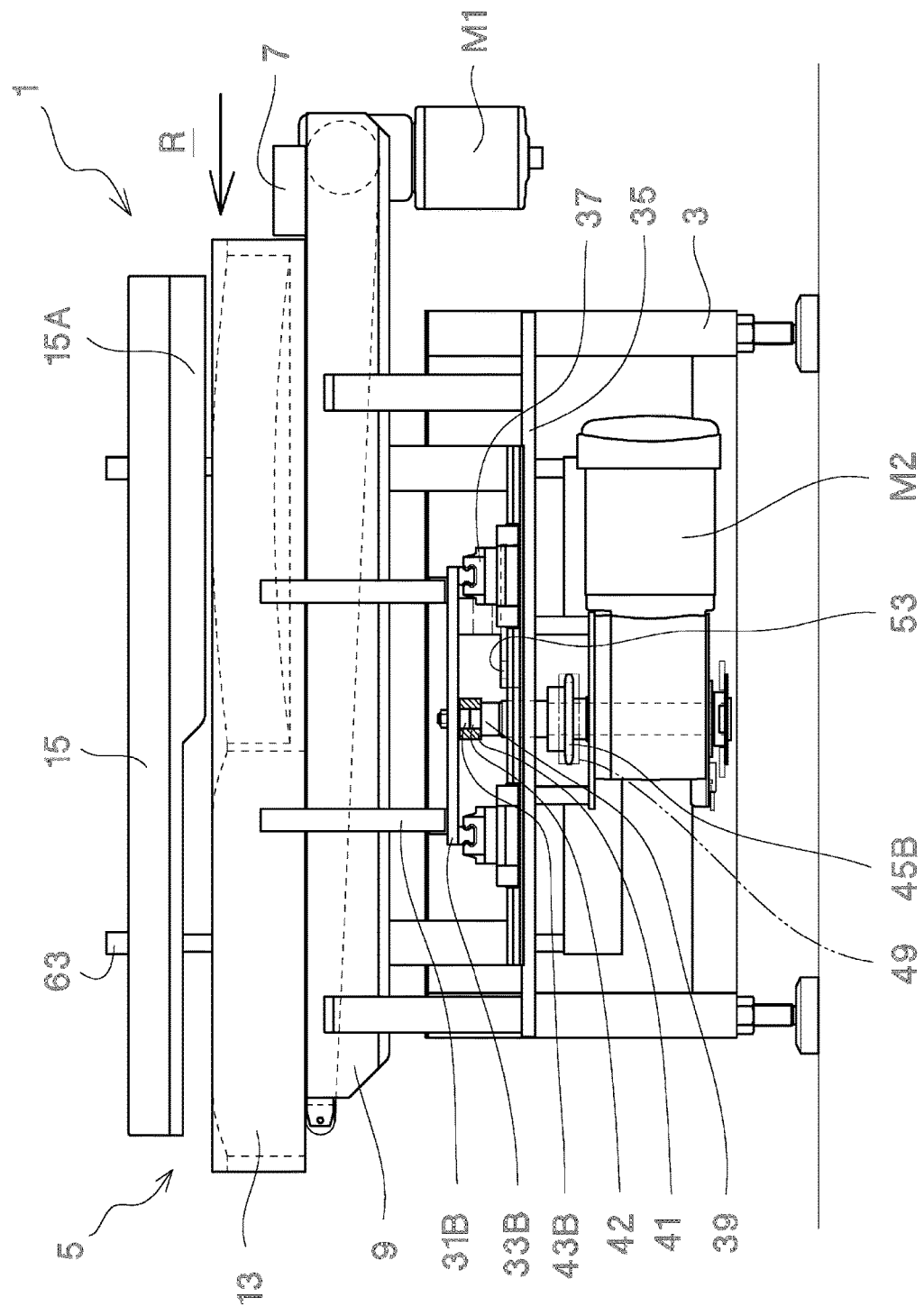
FIG. 1 illustrates a front view of the general configuration of the rounding machine of the first embodiment of the present invention.

FIGS. 1 to 5 illustrate a rounding machine 1 for rounding the pieces of food dough of the first embodiment of the present invention and applied to, for instance, bread dough pieces, as examples of the food-dough pieces 7, in particular, adhesive dough pieces made of artisan bread.

The rounding machine 1 includes a box-like main frame 3 at the top of which a rounding section 5 is provided. The rounding section 5 is provided with a first belt conveyor 9 as a conveying device for conveying the bread dough pieces (the food-dough pieces) 7 and a pair of opposing shaping plates 11 and 13 for kneading and rounding the bread dough pieces 7. Preferably, a pushing-down member 15 for pushing down the dough pieces is vertically moveable and provided above the opposed shaping plates 11 and 13. Inside the main frame 3, a driver for causing the shaping plates 11 and 13 to approach, and retract from, each other, is provided. Also, a driver for elevating the pushing-down member 15 can be provided. Respective driving sources for driving the above components are controlled by a controller.

The belt conveyor 9 conveys the bread dough pieces 7, which are supplied by a dough-supplying source (not shown), by driving a control motor M1. For instance, the dough pieces 7 can be intermittently conveyed with predetermined distances therebetween that are preset in the controller in relation to the movements of the shaping plates 11, 13.

As for the shaping plates 11 and 13, one is located on one of the two sides in the width direction (the horizontal direction, perpendicular to the conveying direction) of the belt conveyor 9. The other is located on the other side in the width direction such that the length of each shaping plate is along the conveying direction R of the belt conveyor 9. The respective shaping plates 11 and 13 revolve along a locus of movement that comprises the longitudinal component in which the shaping plates move in opposite directions relative to each other along their lengthwise direction and the width component in which the respective shaping plates move relatively to approach and move from away each other, along their widthwise direction, and perpendicular to their lengthwise direction. The strokes of the respective shaping plates in the longitudinal component are longer than those of them in the width component. In this way, when the shaping plates 11 and 13 are close to each other to knead the bread dough pieces 7, the shaping plates 11 and 13 move in opposite directions along the travelling direction R.

Figure 2:
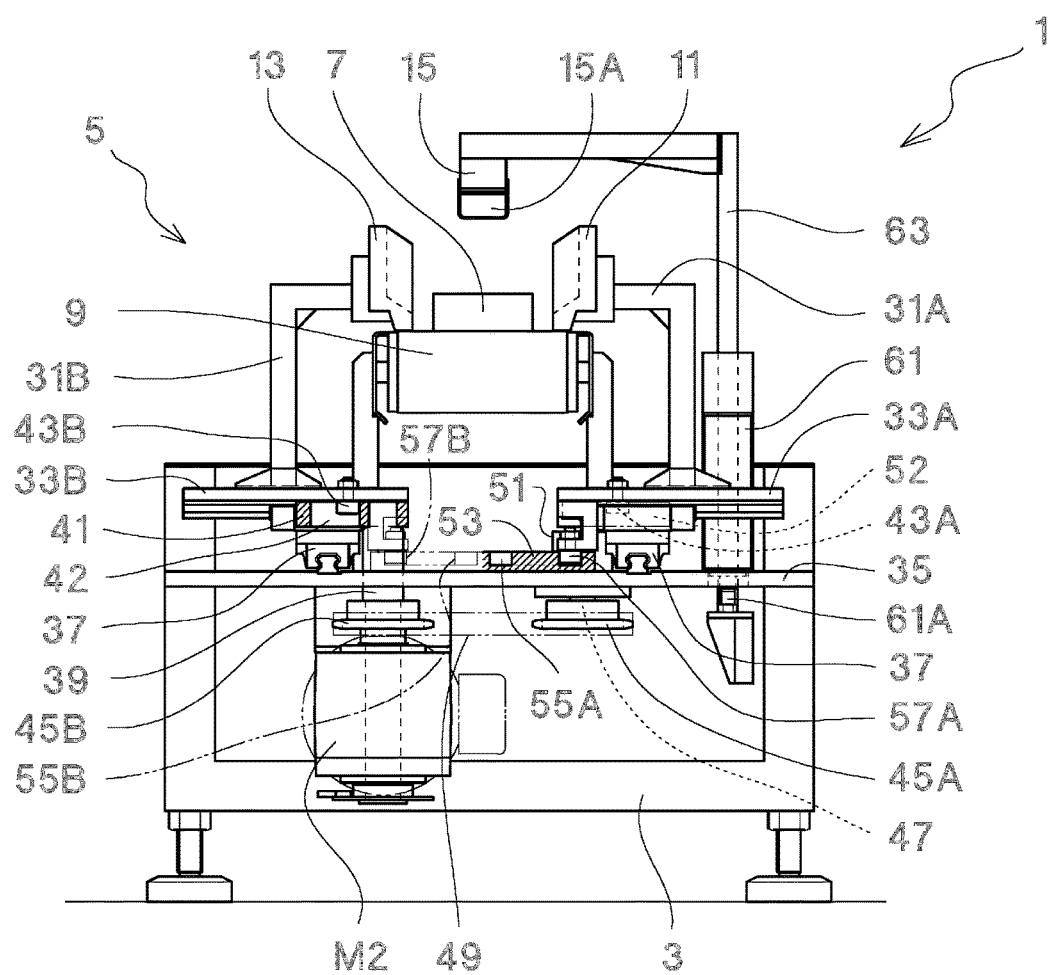
FIG. 2 illustrates a side view of the general configuration of the rounding machine of the first embodiment of the present invention.
Figure 3:
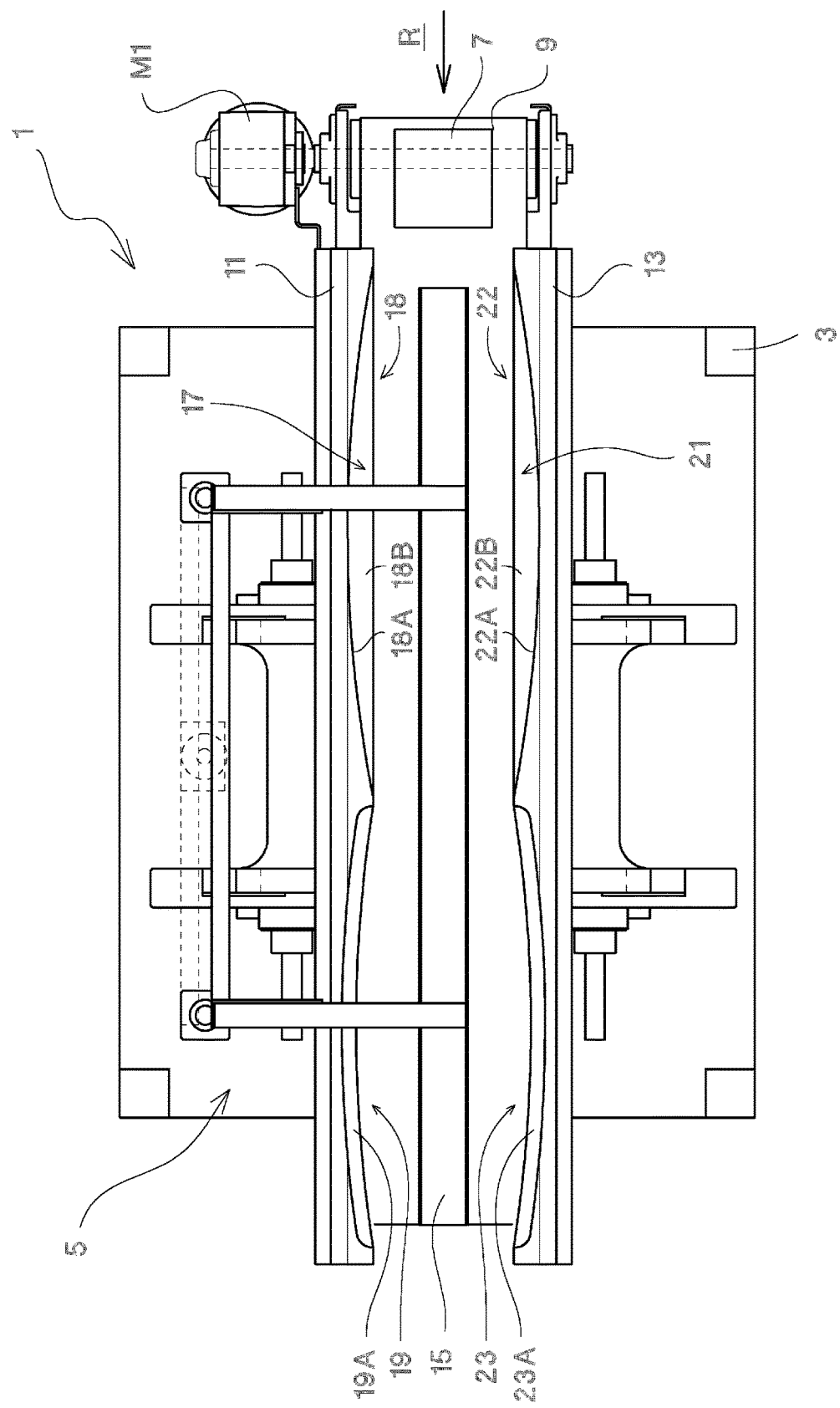
FIG. 3 illustrates a plan view of the general configuration of the rounding machine of the first embodiment of the present invention.
Figure 4:
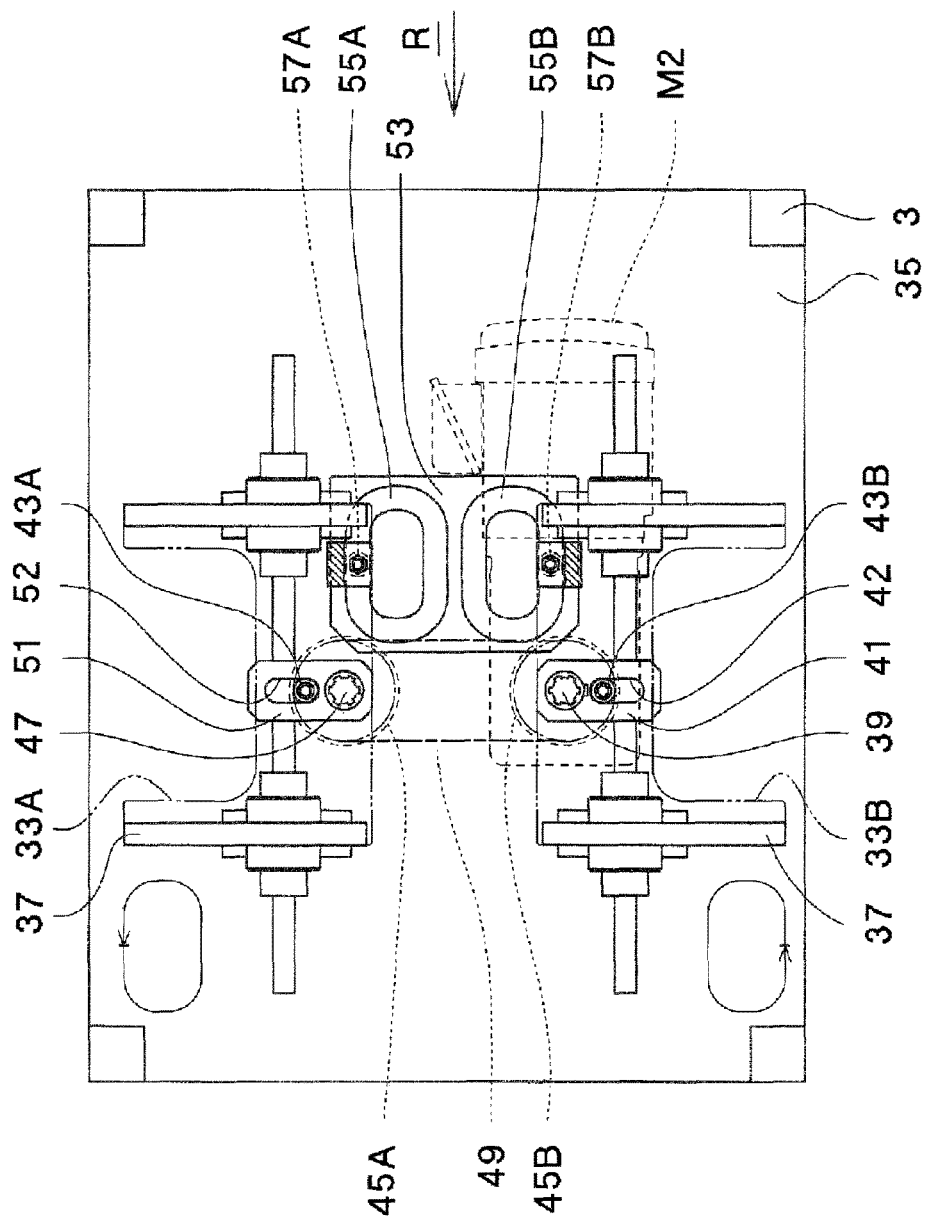
FIG. 4 illustrates a plan view of the driving device for shaping plates that are employed in conjunction with the rounding machine of the first embodiment of the present invention.

Each shaping plate 11 or 13 is formed to have a bilateral symmetry, as shown in FIG. 2. The shaping faces and are formed symmetrically with respect to an imaginary plane (hereafter, "the middle-vertical face") that is positioned at the midpoint between the opposed shaping plates 11 and 13 and perpendicular to the conveying plane of the belt conveyor 9. The shaping plate 11 and the shaping plate 13 are provided with a dough-holding section 17 for holding dough and a dough-holding section 21 for holding dough such that the dough-holding section 17 and the dough-holding section 21 are plane-symmetrical in relation to the middle-vertical face. On the sides of the respective shaping plates 11 and 13, the sides opposed to the middle-vertical face refer to inner sides, while the sides opposed to the insides refer to outer sides.

Figure 5:
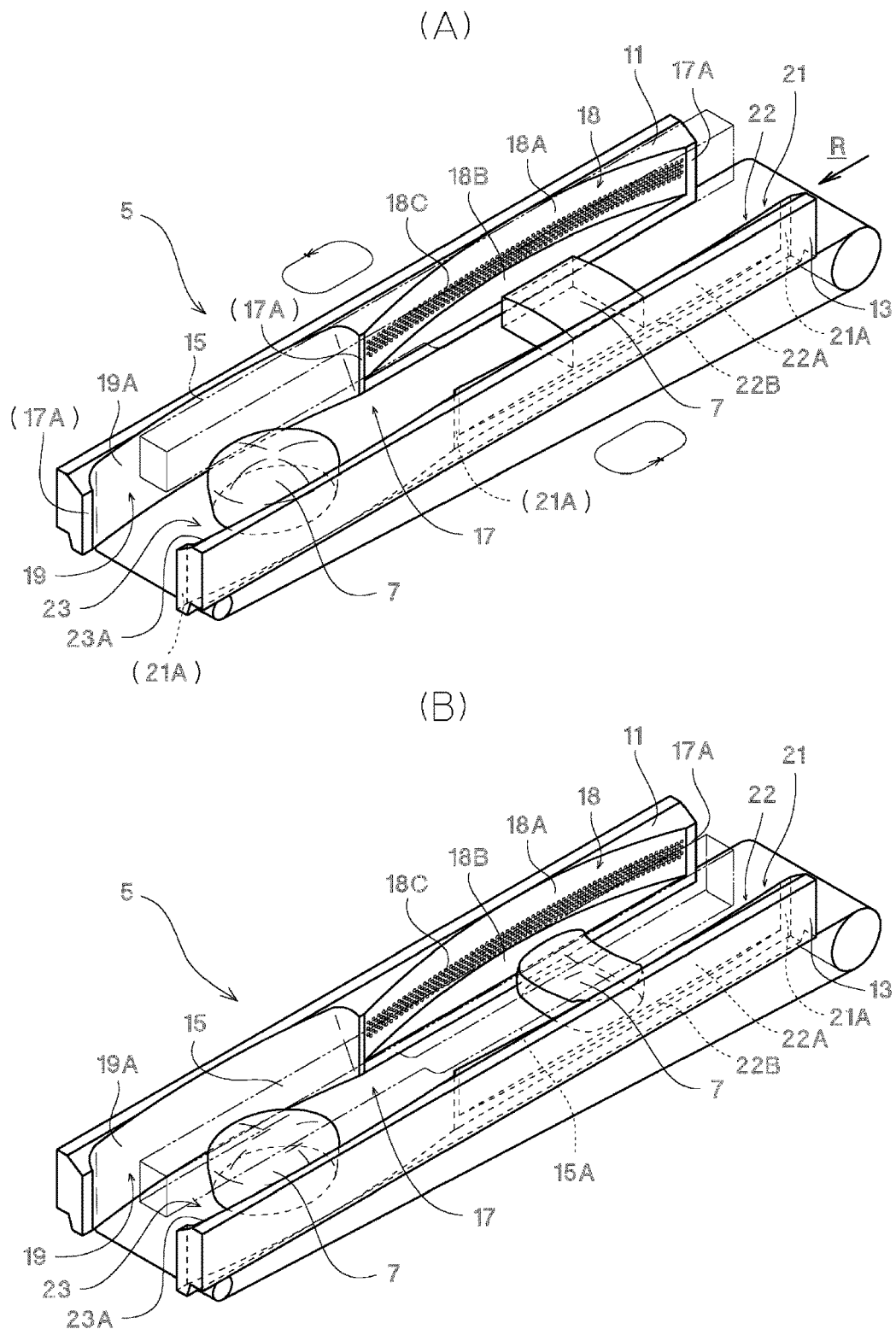
FIGS. 5 (A) and (B) illustrate perspective views of the configuration of the main part of the shaping section that is employed in conjunction with the rounding machine of the first embodiment of the present invention.

As shown in FIG. 5, the dough-holding section 17 is provided with vertical planes 17A at the end of the upstream portion, the generally middle portion, and the end of the downstream portion, along the longitudinal direction of the shaping plate 11. The dough-holding section 17 is also provided with a first dough-holding section 18 for holding dough between the respective vertical planes 17 and a second dough-holding section 19 for holding dough on the downstream side of the first dough-holding section 18.

The first dough-holding section 18 includes a first shaping face 18A, which is concave, and curved from the inner side to the outer side of the shaping plate 11. That is, the first shaping face 18A is gradually and outwardly displaced from the vertical planes 17A at the end of the upstream portion to the longitudinal direction. After it arrives at a point located an arbitrary distance from the middle-vertical face, the first shaping face 18A is gradually and inwardly displaced to be connected to the vertical plane 17A at the middle portion. The first shaping face 18A is also provided with a protruding section 18B. The protruding section 18B continuously protrudes from the lower end of the first shaping face 18A to the middle-vertical face such that the distal portion (the inner vertical face) of the first shaping face 18A is located on the same plane of the vertical face 17A. The top surface of the protruding section 18B is inwardly and downwardly inclined to the inner side (the middle-vertical face side).

On the lower portion of the first shaping face 18A, a dimpling process 18C is applied. With the dimpling process 18C, the shaping faces can be pressed, and can hold the bread-dough pieces 7, without them slipping when they make the bread-dough pieces 7. The dimpling process 18C prevents the bread-dough pieces 7 from sticking to the shaping faces, and thus contributes to making a stable rounding process. Alternatively, to form such shaping faces with corrugated surfaces to hold the bread-dough pieces 7 and have a high peeling property, appropriate modifications may be possible, as, for instance, a pearskin-like finish may be formed by sandblasting, or non-adhesive materials for the conveyor belt having canvas-like surfaces may be affixed to the shaping plate 11 itself.

The second dough-holding section 19 includes a second shaping face 19A, which is concave, and curved from the inner side to the outer side of the shaping plate 11. That is, the second shaping face 18A is gradually and outwardly shifted from the vertical planes 17A at the middle portion in the longitudinal direction. After it arrives at a point located an arbitrary distance from the middle-vertical face, the second shaping face 19A is gradually and inwardly displaced to be connected to the vertical plane 17A at the end of the downstream portion. The second shaping face 19A is also outwardly inclined from the lower side to the upper side such that the distance from the middle-vertical face is narrower at the lower side and is wider at the upper side. The angle of the inclination is arbitrary and can have an arbitrary inclination based on the property or the size of the bread-dough piece.

Because the dough-holding section 21 for holding the dough of the shaping plate 13 is symmetrically formed, with the dough-holding section 17 relative to the middle-vertical face, the detailed description of it is omitted. The dough-holding section 21 is provided with a vertical face 21A, corresponding to the vertical face 17A, a first dough-holding section 22 for holding dough corresponding to the first dough-holding section 18, and a second dough-holding section 23 for holding dough corresponding to the second dough-holding section 19. The first dough-holding section 22 is provided with a first shaping face 22A, corresponding to the first shaping face 18A, and a protruding section 22B corresponding to the protruding section 18B. On the first shaping face 22A, a dimpling process 22C corresponding to the dimpling process 18C is carried out. The second dough-holding section 23 is provided with a second shaping face 23A corresponding to the second shaping face 19A and an inclination corresponding to the inclination of the second shaping face 19A.

The driving mechanisms of the shaping plates 11, 13 will now be explained. The shaping plates 11 and 13 are fixed to supporting plates 33A and 33B, respectively, which move in the horizontal direction along a substantially oval locus, through supporting arms 31A and 31B. The respective supporting plates 33A and 33B are supported by linear rails 37, which are attached to the upper face of a base plate 35 of the main frame 3. The linear rails 37 are provided such that the supporting plates 33A, 33B can be moved in the conveying direction and the width direction.

A control motor M2 is mounted on the lower surface of the base plate 35 through a bracket. The upper end (the upper side in FIG. 1) of a rotating shaft 39 of the control motor M2 is attached to the proximal end of a rotating arm 41. The distal end, which is eccentric to the proximal end, of the rotating arm 41, is provided with an elongated slot 42 in which a cam follower 43B, which is suspended from the supporting plate 33B, is movably engaged.

The middle position of the rotating shaft 39 is provided with a sprocket 45B. Also, the lower end of a rotating shaft 47, which is rotatably supported by the base plate 35 under the supporting plate 33A, is provided with a sprocket 45A. The sprocket 45A and the sprocket 45B are coupled to a chain 49 such that they are synchronally rotated in the same direction. The upper end of the rotating shaft 47 is fixed to the proximal end of a rotating arm 51. The distal end, which is eccentric to the proximal end, of the rotating arm 51, is provided with an elongated slot 52 in which a cam follower 43A, which is suspended from the supporting plate 33A, is movably engaged. The rotating arm 41 and the rotating arm 51 are arranged such that they are synchronally rotated with a phase difference of 180 degrees, as viewed from above (see FIG. 4).

Attached to the upper surface of the base plate 35 is a guiding member 53. The guiding member 53 is provided with guiding slots 55A and 55B, which have the same shapes, in parallel in the width direction (the vertical direction in FIG. 4). Each guiding slot 55A or 55B is substantially formed as an oval, as in the example of the illustration, such that the major axis of it lies along the conveying direction. In the guiding slots 55A and 55B, cam followers 57A and 57B, which are suspended from the lower surfaces of the supporting plates 33A and 33B, are movably engaged.

The rotating arms 41 and 51 are synchronously rotated through the rotating shafts 39 and 47 by driving the control motor M2. Thus, the supporting plates 33A and 33B are moved horizontally through the cam followers 43B and 43A that are engaged with the elongated slots 42 and 52, to cause the shaping plates 11 and 13 to be moved. The movements of the shaping plates 11 and 13 trace a locus along, for instance, the oval shape, of the guiding slots 55A and 55B of the guiding member 53.

Figure 6:
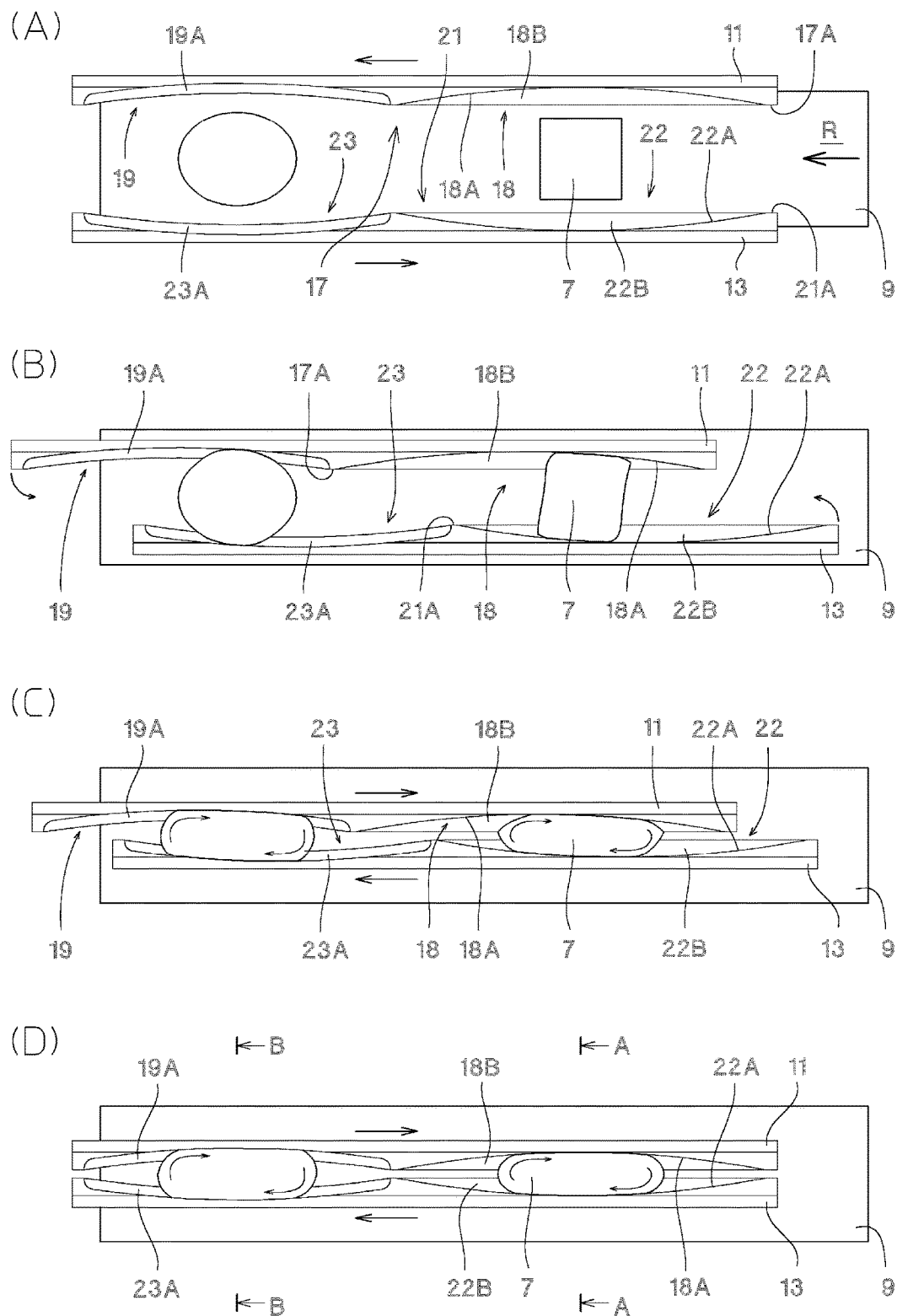
FIGS. 6(A) to (D) illustrate plan views showing the operation of the shaping section that is employed in conjunction with the rounding machine of the first embodiment of the present invention.
Figure 7:
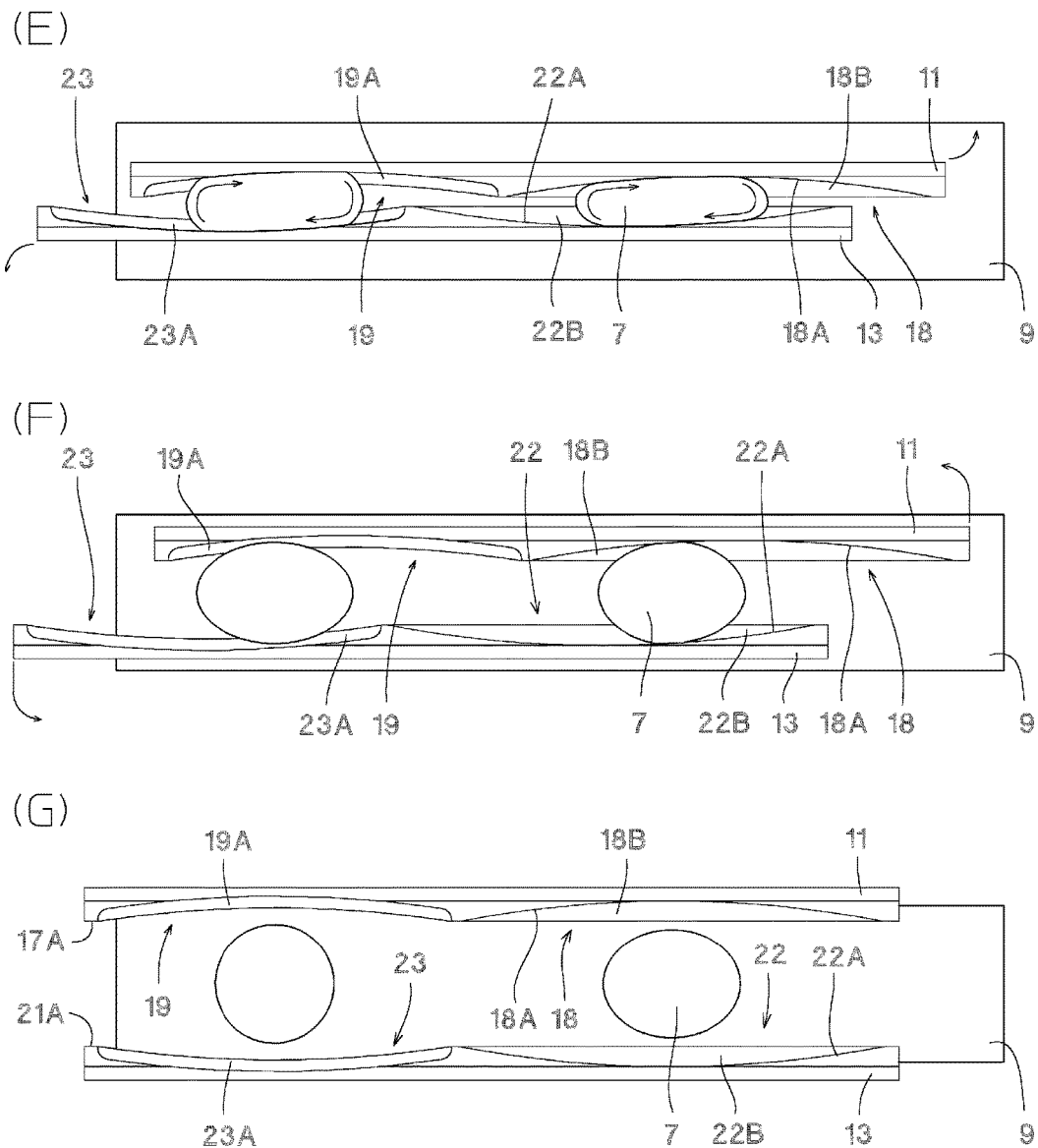
FIGS. 7 (E), (F), and (G) illustrate plan views showing the following operation of the shaping section that is employed in conjunction with the rounding machine of the first embodiment of the present invention, continuous from FIG. 6(D) to the following operation.

In this embodiment, it is assumed that the state as shown in FIG. 6A is the initial position, i.e., where the shaping plates 11 and 13 are moved. In this position, the shaping plates 11 and 13 are the greatest possible distance apart from each other and are arranged in parallel in the conveying direction. Upon driving the driving motor M2, the shaping plate 11 is moved linearly to the downstream portion of the conveying direction R, while the shaping plate 13 is moved linearly to the upstream portion of the conveying direction R. Then the shaping plate 11 is inwardly (toward the side of the shaping plate 13) moved, while the traveling direction of it is turned from the downstream side to the upstream side, along the locus of a substantially circular arc. Simultaneously, the shaping plate 13 is moved inwardly (the side of the shaping plate 11), while the traveling direction of it is turned from the upstream side to the downstream side, along the locus of the substantially circular arc, such that the shaping plates 11 and 13 are close to each other (see FIG. 6B). Maintaining the distance between the shaping plates 11 and 13, the shaping plate 11 is moved linearly to the upstream side, while the shaping plate 13 is moved linearly to the downstream side, such that they come abreast of each other at the same position in the travelling direction (see FIG. 6D). Further, the shaping plate 11 is moved linearly to the upstream side, while the shaping plate 13 is moved linearly to the downstream side (see FIG. 7E). Then the shaping plate 11 is outwardly moved, while the traveling direction of it is turned from the upstream side to the downstream side along the locus of the substantially circular-arc locus such that the shaping plate 11 is moved linearly to the downstream side to return to the initial position. The shaping plate 13 is outwardly moved, while the traveling direction of it is turned from the downstream side to the upstream side along the locus of the substantially circular arc such that the shaping plate 13 is moved linearly to the upstream side, to return to the initial position.

The pressing-down member 15 for pressing-down the dough pieces is located midway between the shaping plates 11 and 13 such that the length thereof is oriented along the conveying direction R. The pressing-down member 15 is drivingly coupled to a reciprocating shaft (a cylinder rod) 61A of a hydraulic cylinder 61, which is mounted on the base plate 35, through a supporting arm 63, to vertically move it. The bottom face of the pressing-down member 15 is provided with a step such that the upstream side of the long side protrudes beneath the lower side relative to the downstream side, to form a protruding section 15A. Thus, in the pressing-down member 15, the distance between the bottom face thereof and the conveying face of the belt conveyor 9 is narrower at the upstream end relative to the downstream end. The pressing-down member 15 is lowered between the shaping plates 11 and 13 after they approach each other, to round the bread-dough pieces 7 and when the shaping plates 11 and 13 retract from each other. The pressing-down member 15 is moved up when the shaping plates 11 and 13 approach each other. The pressing-down member 15 presses the bread-dough pieces 7 to strongly flatten out and beat them at the protruding section 15A, while the pressing-down member 15 lightly contacts the heads of the bread-dough pieces 7 at its downstream side (there is no protruding section 15A) (see FIG. 5B). The pressing-down member 15 prevents the bread-dough pieces 7 from sticking to the shaping plates 11 and 13, which retract from each other, to outwardly move, and thus they are shifted from the middle point between the opposed shaping plates 11 and 13.

With one motion, where the shaping plates 11 and 13 approach and retract from each other, and another motion, where the pressing-down member 15 goes up and down, the bread-dough pieces 9 are kneaded, and thus one rounding process is carried out. The rounding machine 1 can be appropriately configured such that one or more rounding processes can be repeated while the belt conveyor 9 is interrupted while it is being conveyed. Because the belt conveyor 9 can be appropriately configured to set the conveying distance (a pitch) of the intermittent conveying, the rounding process for the bread-dough pieces 7 can be repeated at a plurality of stopping positions along the conveying direction R that the belt conveyor 9 travels.

The process of rounding the bread-dough pieces 7 using the above rounding machine 1 will now be explained. In the first embodiment of the present invention, as shown in FIG. 5, it is assumed that dough pieces 7 on the belt conveyor 9 are rounded in two positions, in which the conveying motion is intermittently interrupted per a predetermined distance (a pitch). First, each bread-dough piece 7 is cut from a bar-like shaped bread dough to have a predetermined weight. The cut rectangular bread-dough piece 7 is then supplied on the upstream side (the left side in FIG. 1) of the belt conveyor 9, conveyed a set distance (a pitch) as defined by the belt conveyor 9, and is located between the shaping plates 11 and 13, which have retracted from each other and stopped. In the above two rounding positions, it is assumed that the upstream one is a first position, while the downstream one is a second position. FIG. 5A illustrates a state in which the respective bread-dough pieces 7 are conveyed at the stopping positions. FIG. 5B illustrates a state in which the respective bread-dough pieces 7, which have been kneaded by the shaping plates 11 and 13 at the respective stopping positions, are pressed down from above by the pressing-down member 15.

At the first position, the bread-dough piece 7 is rounded by means of the first dough-holding sections 18 and 22. The bread-dough piece 7 is conveyed and stopped at the first position, and the shaping plates 11 and 13 that have stopped begin to move along the locus of what is substantially an oval shape and approach each other, such that the dough-holding sections 17 and 21 hold the bread-dough piece 7 (see FIG. 6B). At this time, both side edges of the bread-dough piece 7 are pressed by the protruding sections 18B and 22B to be tucked down in the lower face of the bread-dough piece 7. The shaping plates 11 and 13 then begin to move in opposing directions along their respective longitudinal directions, while they approach each other (see FIG. 6C). Thereafter, the shaping plates 11 and 13 continue to move substantially linearly in opposite directions along their respective longitudinal directions (see FIG. 6D). As discussed above, because the first shaping faces 19A and 23A are concave curves, the bread-dough piece 7 is subjected to pressure substantially in the direction of its center. Because the first shaping faces 18A and 22A move in opposing directions while they apply the centrally-directed pressure to the bread-dough piece 7, the bread-dough piece 7 is rolled horizontally around its center axis. At this time, the protruding sections 18B and 22B clamp the winding end of the bottom of the bread-dough piece 7. Because the top surfaces of the protruding sections 18B and 22B are inwardly and downwardly inclined, the lower portion of the bread-dough piece 7 is subject to a torsion effect that is greater than that of the upper portion thereof. Thus, the bread-dough piece 7 forms the winding end, while the side faces of the top surface thereof are pulled downward. As the gap between the respective protruding sections of the shaping plates 11 and 13 is narrowed, the torsion effect mentioned above is enhanced. Thereafter, the shaping plates 11 and 13 then begin to move in directions in which they are retracted from each other (see FIG. 7F). At this time, the first shaping faces 19A and 23A have curved ends that are concave, and thus continuously facilitate rolling the bread-dough piece horizontally during their retracting motions. Thereafter, the shaping plates 11 and 13 are retracted from each other and then they release the bread-dough piece 7 (see FIG. 7G).

Figure 8:
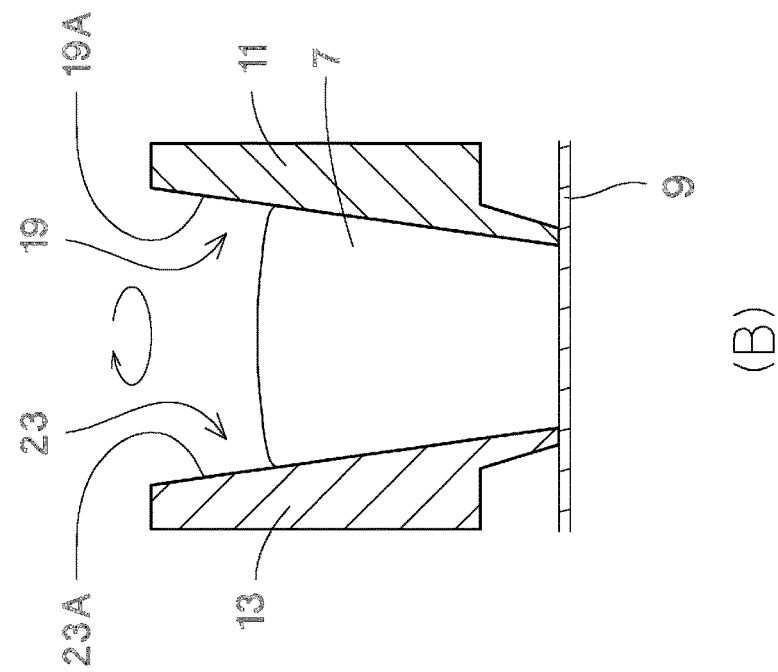
FIGS. 8 (A) and (B) are drawings to illustrate the shape of the shaping section that is incorporated in the shaping plate of the first embodiment of the machine and the process for rounding dough of the present invention.
Figure 8:
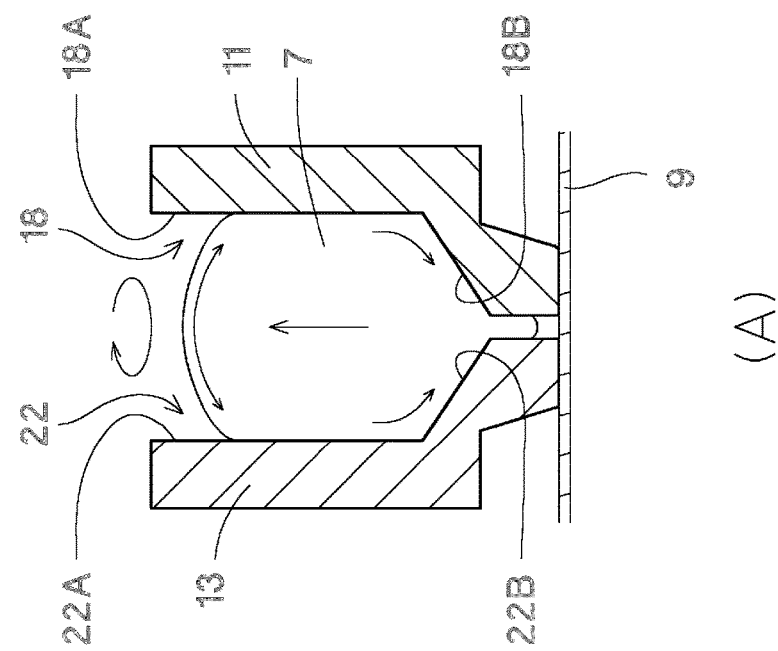

As discussed above, in the rounding process at the first position, in contrast to the prior art, rolling the bread-dough piece 7 horizontally is caused by forces generated by the pressure from the concave curvature of the first shaping faces 18A and 22A without any linear contact between the dough piece and a guide plane. Therefore, the possibility of adhesion can be decreased and thus damage to and a faulty shape of the dough piece can be prevented. As the bread-dough piece 7 is rolled horizontally, all parts of circumferences of both edges of the sides of the bread-dough piece 7 are subjected to pressure from the protruding sections 18B and 22B. The protruding sections 18B and 22B are tucked down, at all parts of the circumferences of both edges of the sides of the bread-dough piece 7, into the lower surface thereof to form the winding end on the bottom of the bread-dough piece 7, without any part being omitted (see FIG. 8A). This eventually provides a firm surface for the bread-dough piece 7 provides a stable shape. In addition, because the bread-dough piece 7 is subjected to a centrally-directed pressure during the rounding process, a shift in the longitudinal direction of it can be prevented.

When the shaping plates 11 and 13 are retracted from each other to release the bread-dough piece 7 at the first position, the pressing-down member 15 is rapidly lowered such that the protruding section 15A flattens the bread-dough piece 7 from above to sandwich and press it between the protruding section 15A and the conveying surface of the belt conveyor 9 so as to horizontally roll and elongate the bread-dough piece 7. After a short time, the pressing-down member 15 is raised. In this position, the rounding processes are repeated, for instance, twice, such that the bread-dough piece 7 is formed by dispersing projections and corners on the surfaces thereof. Further, with the lateral pressing and holding by the shaping plates 11 and 13 and the rotation, and the beating and pressing coming from above by the protruding section 15A, small and large bubbles (gases) that are non-homogeneous and distributed within the bread-dough piece 7 are dispersed to gradually make uniform the inner layers therein.

Figure 9:
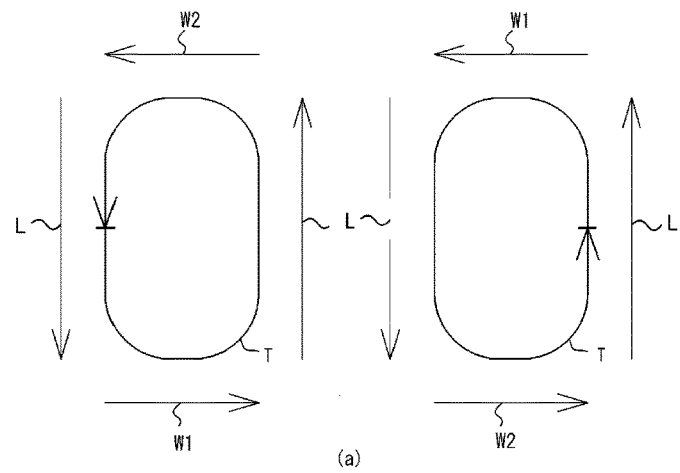
FIGS. 9 (a), (b) and (c) are diagrams of examples of loci of the movements of the shaping plates of the machine and the process for rounding dough.
Figure 9:
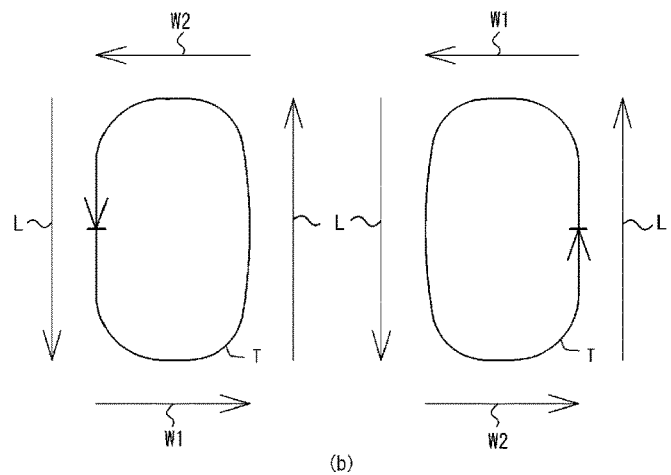
Figure 9:
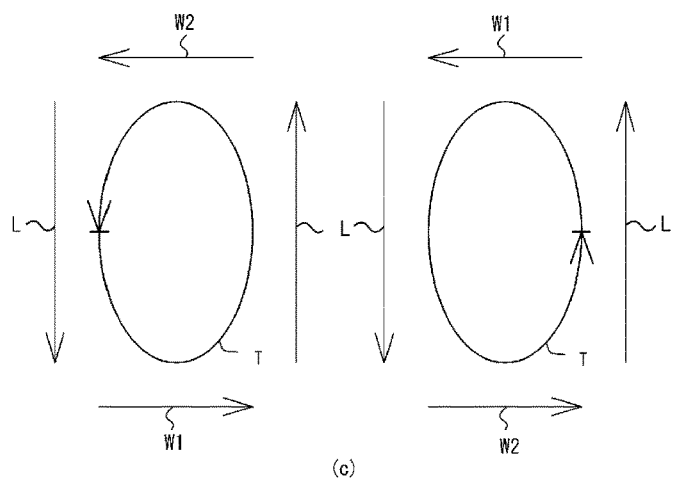

FIGS. 9 (*a*), (*b*), and (*c*) show examples of loci T in which the shaping plate 11 (not shown in FIG. 9, but it is located in the left side therein) and the shaping plate 13 (it is located in the right side in FIG. 9) move. In FIG. 9, an arrow L denotes the direction of the longitudinal component in the kneading process, an arrow W1 denotes the direction of the width component when the shaping plates come close to each other, and an arrow W2 denotes the direction of the width component when the shaping plates move away from each other. In the movements of loci T of the shaping plates 11 and 13, the longitudinal component may trace a substantially linear line, as shown in FIG. 9 (*a*) and in the above embodiment, but may also follow a nonlinear line. For instance, as shown in FIG. 9 (*b*), the longitudinal component may protrude in the opposite direction such that it may include a slightly curved arc component or a substantially curved arc component. Alternatively, the movements of loci T may trace a substantial ellipse, as shown in FIG. 9 (*c*).

Each locus T as shown in FIG. 9 includes the following steps.

Step (a): The bread-dough pieces (the food-dough pieces) 7 of the belt conveyor 9 are laterally pressed and held by the shaping plates 11 and 13 so that they are close to each other in the width component.

Step (b): The bread-dough pieces are rounded by moving the shaping plates 11 and 13 opposite each other along the longitudinal component when or after the shaping plates 11 and 13 are close to each other.

Step (c): The shaping plates 11 and 13 retract from each other in the width component to release the bread-dough pieces 7 after the shaping plates 11 and 13 are close to each other, and during or after the rounding step.

Step (d): The above steps (a), (b), and (c) are carried out one or more times. When the bread-dough pieces (the food-dough pieces) 7 are rounded, the shaping plates 11 and 13 affect the bread-dough pieces 7 such that the length of the motion of the longitudinal component is longer than that of the width component, to enhance the rounding effect on the bread-dough pieces (the food-dough pieces) 7.

Note that the movements of loci T as shown in FIGS. 9 (*a*), (*b*), and (*c*) are intended to just be examples. The locus of the movement of the paired shaping plates 11 and 13 of the present invention include the longitudinal component. In that component, the shaping plates are positioned relatively opposite each other along their lengths and along the width component, in which component the shaping plates relatively approach each other, and move away from each other, along the width direction, which is perpendicular to the length such that the distance moved in the longitudinal component is greater than that in the width component. That is, the locus of the movement locus of the paired shaping plates 11 and 13 is not strictly limited to the illustrated loci. For example, the distance traveled by the shaping plate 11 may differ from that of the shaping plate 13.

After the rounding processes were twice repeated at the first position, the bread-dough piece 7, being formed substantially circular, is conveyed by one pitch and is stopped at a second position between the shaping plates 11, 13 (see FIG. 6A). In the second position, the bread-dough piece 7 is enveloped by the second dough-holding sections 19 and 23, and kneaded until its shape was adjusted. First, the concave curvature of the second dough-holding sections 19 and 23, with the closing motions of the shaping plates 11 and 13, hold the bread-dough piece 7. The shaping plates 11 and 13 then begin to move along, e.g., as the locus of a substantial oval shape (see FIGS. 6B and 6C). The shaping plates 11 and 13, which are substantially linear, move opposite each other along the longitudinal direction (see FIG. 6D). In this case, because each second dough-holding section 19 or 23 is concave and curved as mentioned above, the bread-dough piece 7 is subjected to a centrally-directed pressure. Because while the centrally-directed pressure is applied the second dough-holding sections 19 and 23 move in opposite directions, the bread-dough piece 7 is rolled horizontally about its center axis. Further, the shaping plates 11 and 13 begin to move in the directions in which they retract from each other (see FIG. 7E). In this case, because as mentioned above the first shaping faces 19A and 23A are concave curves, their ends facilitate the rolling of the bread-dough piece 7 in the horizontal direction, while they are being retracted from each other. During the above shaping processes, with the outward inclinations of the first shaping faces 19A and 23A being as described above, the bread-dough piece 7 is twisted from the upper portion to the lower portion such that the surface layer of the bread-dough piece 7 is guided from the top to the lower side and then to form the tight skin of the bread-dough piece 7. Thereafter, the first shaping faces 19A and 23A retract from each other, while they facilitate the rolling of the bread-dough piece 7 in the horizontal direction, to release the bread-dough piece 7 (see FIG. 7F). At the second position, the rounding processes are also repeated twice.

Like the rounding process at the first point, in the rounding process at the second point rolling the bread-dough piece 7 in the horizontal direction is caused by the suppressed force of the concave curves, of the second shaping faces 18A and 22A, rather than by a frictional force between the bread-dough piece 7 and the guiding surface. Therefore, the possibility of adhesion can be reduced such that damage to the bread-dough piece 7 and an incorrect shape of the bread-dough piece 7 can be prevented. The rolling of the bread-dough piece 7 horizontally causes firm skins to be formed on all lateral faces thereof by the twisting effect mentioned above (see FIG. 8B). Further, because the second shaping faces 19A and 23A have the concave curved, shapes, when the shaping plates 11 and 13 move in opposite directions along the longitudinal direction, a clamping force that is applied to the bread-dough piece 7 is initially and relatively strong, is then weakened, and then may be strong again. This fact causes a kneading effect on the bread-dough piece 7 such that it is uniformly degassed, and an even inner layers of the bread-dough piece 7 can be obtained. Further, the inclined angle described above may be varied from the upstream side to the downstream side (not shown). That is, the inclination of each dough-holding section is varied from the upstream side along the longitudinal direction and is outwardly increased at a constant rate. Namely, the inclination of each dough-holding section is varied from a high-pitched inclination at the end of the upstream side to a shallow inclination along the longitudinal direction. By providing such an inclination, the bread-dough piece 7 can be continuously formed from its side to its bottom end such that a better and neat rounding process can be carried out.

When the shaping plates 11 and 13 are retracted from each other, the pressing-down member 15 is lowered to press the bread-dough piece 7 from above such that it prevents the bread-dough piece 7 from adhering to the shaping plates 11 and 13 that are retracted from each other, and from shifting from the center position between the opposed shaping plates 11 and 13. The protruding section 15A of the pressing-down member 15 is lowered to press to beat the bread-dough piece 7 from above such that the bread-dough piece C is caused to collapse and be flattened. If a thin surface skin forms on the surface of the dough of the bread-dough piece 7, because the viscosity is degraded, the bread-dough piece 7 may not adhere to the moving and shaping plates 11, 13. In such a case, the pressing-down member 15 may not be able to hold the top of the bread-dough piece 7. Therefore, the present invention has not always had to provide the pressing-down member 15 as one essential element.

With the above rounding machine 1, the above rolling effect prevents the dough piece 7 from adhering to the shaping plates 11 and 13 such that an incorrect shape of the dough piece, damage to the food-dough piece, and undesirable retention of the leading dough piece and the following dough pieces on the conveying device, can be prevented. Also, the rolling effect causes the leading forces applied to the lateral face of the bread-dough piece 7 to be uniform throughout the entire circumference thereof. That is, when the formed surface skin is gathered more than once at the bottom of the bread-dough piece 7, because just the same portion is prevented from leading the bread-dough piece 7 inside, a firm surface skin of the bread-dough piece 7 can be effectively formed. The actions in which the shaping plates 11 and 13 approach and retract from each other cause the bread-dough piece 7 to be repeatedly and laterally clamped, rolled, and released such that the bread-dough piece 7 does not receive any unnecessary friction that would prevent an adherence, as well as causing less damage to be received by the bread-dough piece 7. Further, at least in the early stage of the rounding process, not only laterally is the bread-dough piece 7 pinch-pressed by the shaping plates 11 and 13, but the pressing-down member 15 applies the clamping as a beat to the bread-dough piece 7 when the shaping plates 11 and 13 are retracted from each other such that small and large bubbles (gases) that are non-homogeneous and distributed within the bread-dough piece 7 can be dispersed to make uniform the inner layers therein.

Although the conveying device of the first embodiment of the present invention is generally described above, it is not limited to that device. Rather, it can be variously modified within the spirit and the scope of the appended claims. In general, dough, i.e., so called "bread dough," is not uniform. Rather, it refers to various compositions and manufacturing processes for dough, as, for instance, sandwich-loaf dough, sweet-bun dough, and artisan-bread dough. If the same rounding process applies to the complete range of bread dough, an appropriately rounded shape cannot thus be obtained. For instance, the shapes of the first dough-holding sections 18, 22 and the second dough-holding sections 19, 23 of the first embodiment can be reversed. This arrangement is effective, for instance, when cut dough-pieces that lack uniformity are supplied, as the dough-holding sections with the inclination faces first form the dough-pieces into shapes and then the dough-holding sections with the protrusion sections perform the rounding process.

In the rounding machine 1 of the present invention, the number of movements approaching, and retracting from, the respective opposed shaping plates 11 and 13 can be appropriately configured such that the total number of rounding movements can be appropriately set. Namely, the rounding process can be carried out to conform to the property and the desired shape to be rounded of the bread-dough piece 7. For instance, any increased number of rounding movements cause the food-dough piece 7 to be rounded tightly, while any decreased number of rounding movements cause the food-dough piece 7 to be rounded loosely.

In the first embodiment of the present invention, because each shaping plate 11 or 13 constitutes one component, the number of rounding movements that are repeated at the second position are the same as that at the first position. However, the number of rounding movements at the first position can differ from that in the second position. In this case, the shaping plates 11 and 13 may be divided into a shaping plate with the first dough-holding sections 18, 22 and a shaping plate with the second dough-holding sections 19, 23 such that each divided shaping plate may be provided with a separate driving mechanism. In such an embodiment, the first dough-holding sections, and the second dough-holding sections, which that have different advantages from the first dough-holding sections, are provided such that the number of rounding movements at the respective positions can be set to conform to the property of the dough piece. For instance, when a relatively elastic bread-dough piece is rounded, the rounding movement is carried out once by the first dough-holding sections with the protrusion sections, while the rounding movements are carried out twice by the second dough-holding sections with the outward inclinations. The bread-dough piece can be rounded by the minimal number of rounding movements such that excessive stress does not occur thereon.

Alternatively, dough-holding sections of the shaping plates 11 and 13 can be provided three or more times. For instance, each shaping plate 11 or 13 may be provided with a first dough-holding section with the protruding section at the upstream end, a second dough-holding section with the protrusion at the downstream end of the first dough-holding section, a third dough-holding section with the outward inclination at the downstream end of the second dough-holding section, and a fourth dough-holding section with the outward inclination at the downstream end.

Although, in the first embodiment, the two rounding movements are carried out at the first position and the second position, in this embodiment, just one of the rounding movements is carried out at one of the respective positions corresponding to the respective dough-holding sections, to have the same advantage as that of the first embodiment such that this modified embodiment can conform with an enhanced production rate. Alternatively, other than this modified embodiment, modifications of the dough-holding sections may cause changes in the functions of and the advantages to the dough piece. Below such a typical embodiment will now be described in reference to the drawings.

Figure 10:
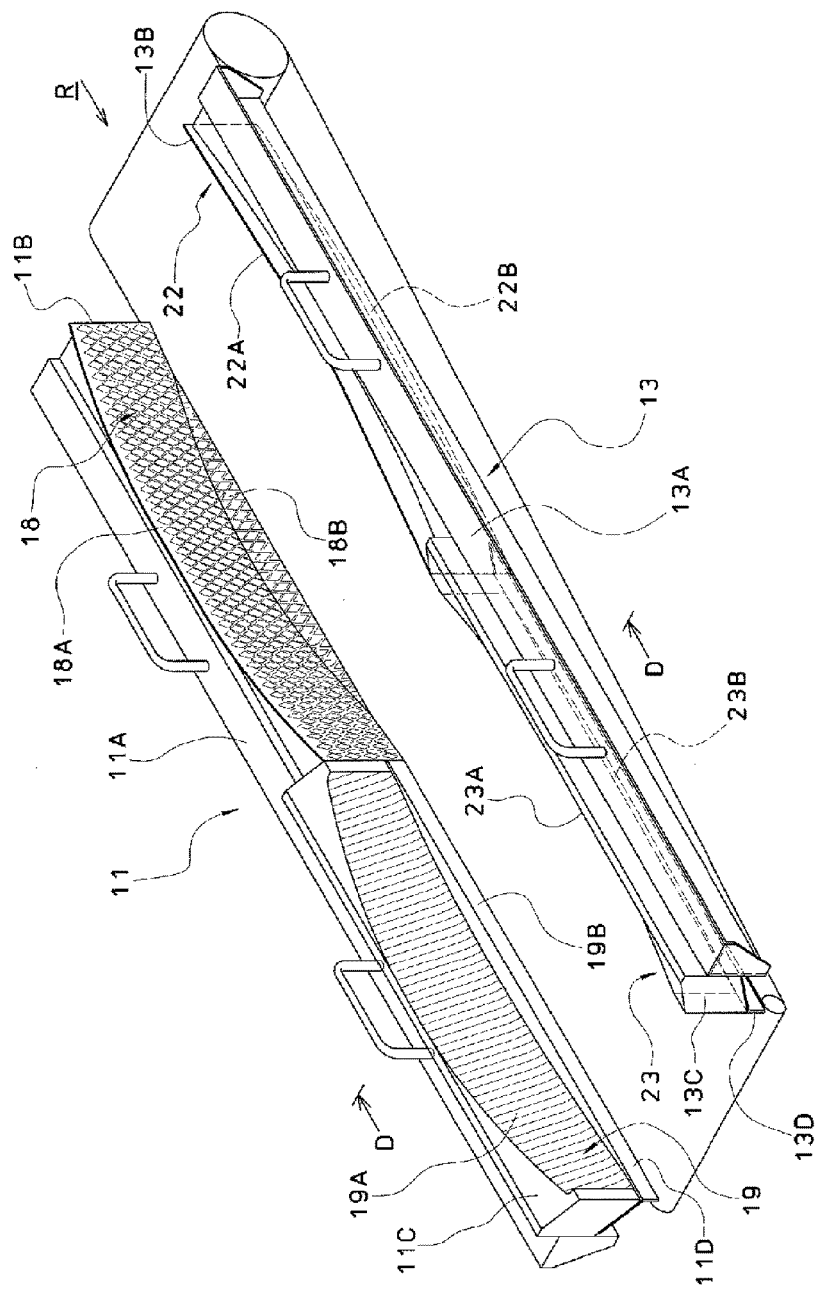
FIG. 10 illustrates a perspective view of the configuration of the main part of the shaping section that is employed in conjunction with the rounding machine of the second embodiment of the present invention.
Figure 11:
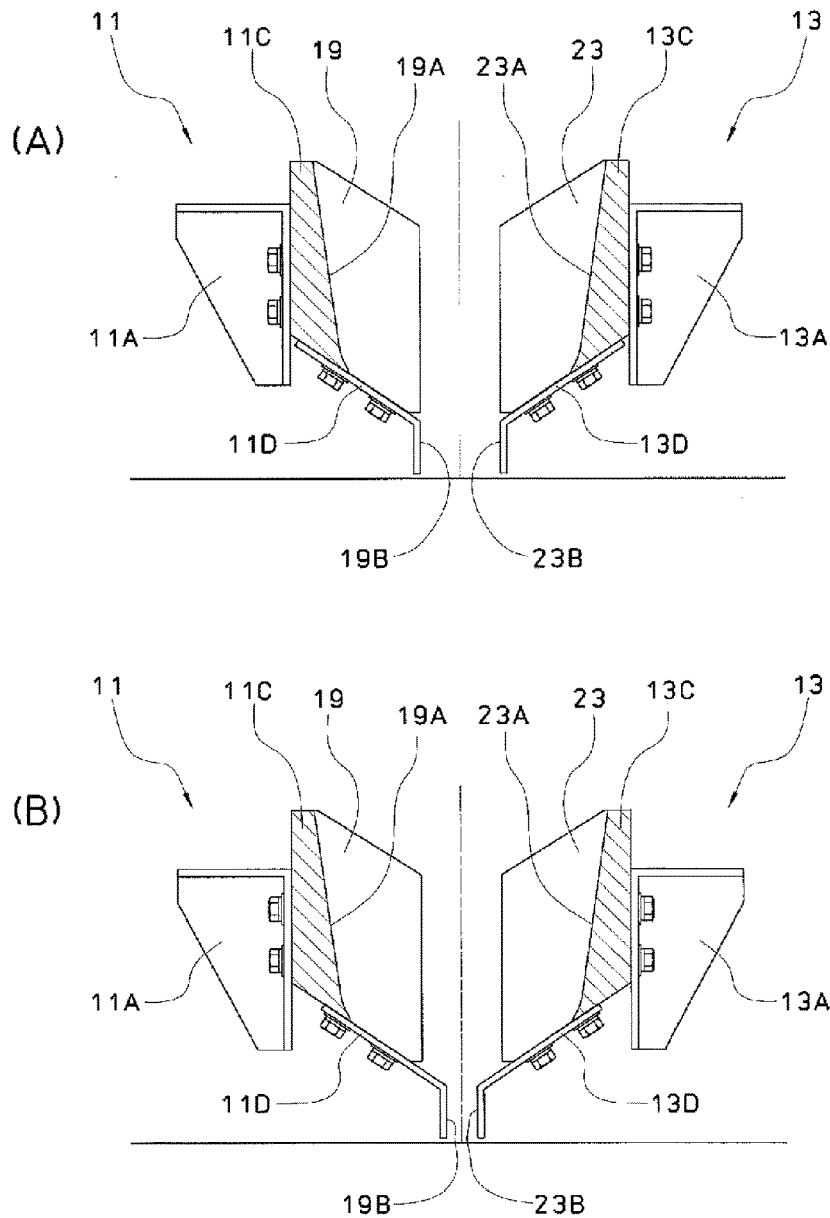
FIGS. 11(A) and (B) are drawings to illustrate the shape of the shaping section that is incorporated in the shaping plate of the second embodiment of the machine and the process for rounding dough of the present invention.

The rounding machine for food dough of the second embodiment will now be described in reference to FIGS. 10 and 11. The second embodiment of the present invention comprises a configuration in which the shapes of the dough-holding sections of the shaping plates 11 and 13 of the first embodiment are modified. The same components of the first embodiment denote the same reference numbers, and so their detailed descriptions are omitted. In the second embodiment of the present invention, both the first dough-holding sections and the second dough-holding sections are provided with protruding sections such that the degrees of projections of the protrusion sections can be altered. In particular, as shown in FIGS. 10 and 11, each shaping plate 11 or 13 is comprised of a plurality of components such that the relative positions of the dough-holding sections and the protruding section can be altered. Thereby the distance of the protruding section projected from the lower end of the shaping face toward the direction of the middle vertical plane can be adjusted. Although below the details of this configuration will be given, the second embodiment is not limited by the first embodiment.

The shaping plate 11 comprises a substrate 11A, a curved plate 11B, a gripping member 11C, and a protruding member 11D, and further includes a first dough-holding section 18 and a second dough-holding section 19. The first dough-holding section 18 is comprised of the curved plate 11B, which is attached to the substrate 11. On the curved plate 11B, a non-adhering belt material having a surface with a concave curve and a convex curve adheres such that the curved plate 11B includes a first shaping face 18A and a first protruding section 18B. The first shaping face 18A is a concave curve, from going inside the shaping plate 11 and toward the outside. The first protruding section continuously protrudes from the lower end of the first shaping section 18A and toward the direction of the middle vertical plane. The upper face of the first protruding section 18B is inwardly and downwardly inclined.

The second dough-holding section 19 is comprised of the gripping member 11C, which is attached to the substrate 11A, and the protruding member 11D, which is attached to the lower surface of the gripping member 11C. The gripping member 11C is provided such that its height relative to the substrate 11A can be altered. Further, the gripping member 11C is provided with a second shaping face 19A, which is concave and curved from the inside toward the outside. The second shaping face 19A is provided with a slot along the longitudinal direction to enhance a holding force against the bread-dough piece. On the protruding member 11D, a second protruding section 19 is formed such that it continuously protrudes from the lower end of the second shaping face 19A toward the middle vertical plane. And the upper face thereof is inwardly and downwardly inclined. The protruding member 11D is provided such that its position relative to the gripping member 11C can be altered. Thereby the degree of inward protrusion of the second protruding section 19 can be adjusted. In this embodiment, the substrate 11A, the gripping member 11C, and the protruding member 11D, are mounted by means of slotted holes and screws, such that their relative positional relationships can be adjusted. Instead, other adjustable mounting arrangements may be employed.

Because the shaping plate 13 is formed symmetrically with the shaping plate 11 relative to the middle vertical plane, the details thereof are omitted. The shaping plate 13 is comprised of a substrate 13A corresponding to the substrate 11A, a curved plate 13B corresponding to the curved plate 11B, a gripping member 13C corresponding to the gripping member 11C, and a protruding member 13D corresponding to the protruding member 11D. The shaping plate 13 further includes a first dough-holding section 22 corresponding to the first dough-holding section 18 and a second dough-holding section 23 corresponding to the second dough-holding section 19. The first dough-holding section 22 is provided with a first shaping face 22A corresponding to the first shaping face 18A and a first protruding section 22B corresponding to the first protruding section 18B. The second dough-holding section 23 is provided with a second shaping face 23A corresponding to the second shaping face 19A and a second protruding section 23B corresponding to the second protruding section 19B.

As discussed above, the second protruding sections 19B and 23B are configured such that their degrees of protrusions relative to the middle vertical plane can be altered. Further, the positions of the leading sections of the opposed second protruding sections 19B and 23B (the vertical plane in FIG. 8) relative to the middle vertical plane can also be gradually varied from the upstream side to the downstream side. In these cases, depending on the degree of the protrusion of each of the second protruding sections 19B and 23B, the heights of the gripping members 11C and 13C relative to the substrates 11A and 13A are altered and positioned to form a small gap between the lower edges of the second protruding sections 19B, 23B and the conveying surface.

By configuring the second protruding sections 19B and 23B to be altered, an effect of twisting the bread-dough piece at the winding end can be adjusted when the dough-piece is shaped. When the opposed second protruding sections 19B and 23B approach each other the effect of the twisting by the protruding sections of the bread-dough piece when the winding end is formed is enhanced. As the result, the firm surface of the rounded bread-dough piece can be relatively strong. In contrast, retracting the opposed second protruding sections 19B and 23B from each other is to weaken the effect of the twisting by the protruding sections on the bread-dough piece when the winding end is formed. As the result, the firm surface of the rounded bread-dough piece can be relatively loose. Namely, the degrees of protrusions of the protruding sections are adjusted based on the property and the size of the bread-dough piece to be shaped to obtain the desired firmness of the product.

Figure 12:
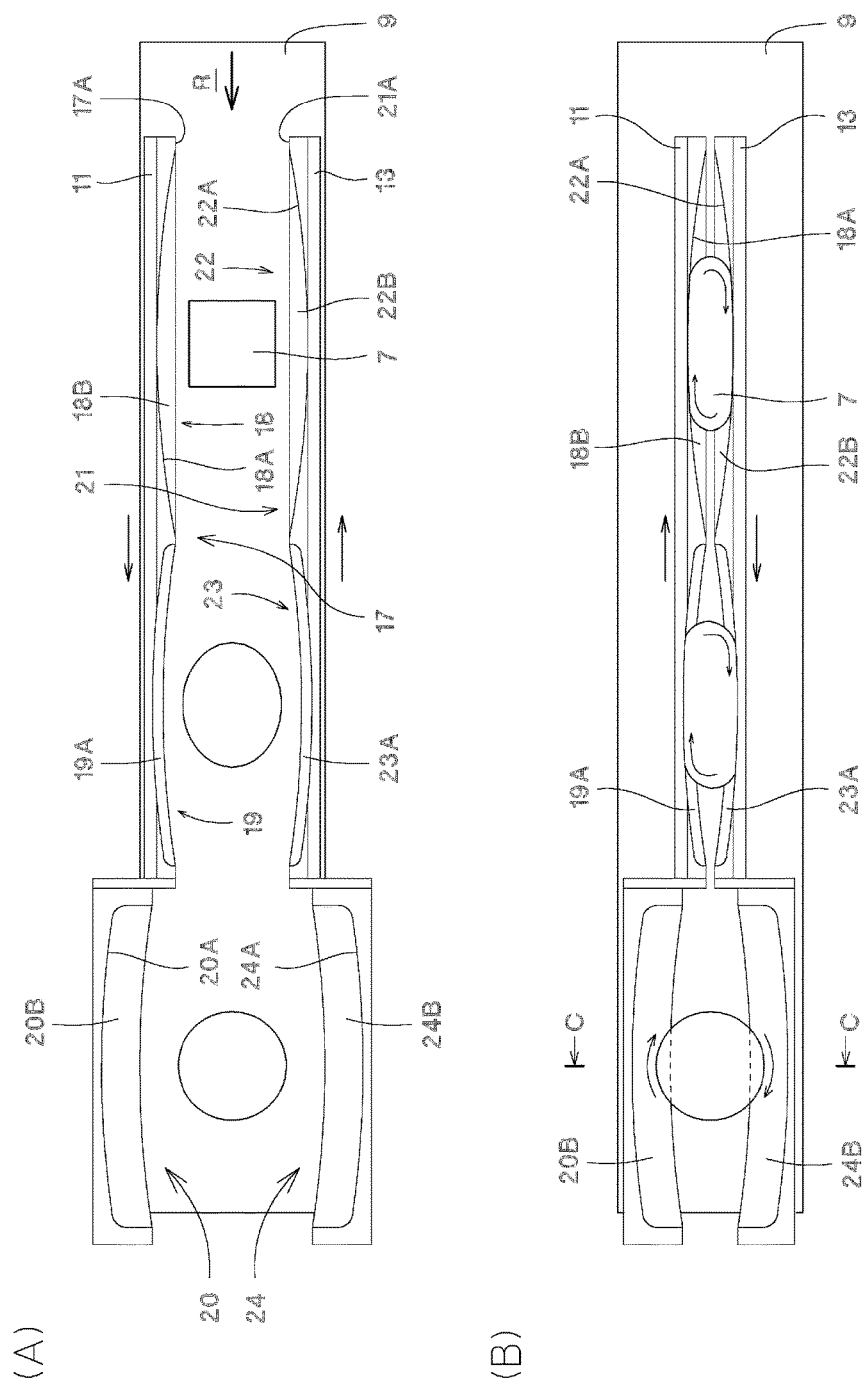
FIG. 12 FIGS. 12 (A) and (B) are illustrative plan views showing the operation of the shaping section that is employed in conjunction with the rounding machine of the second embodiment of the present invention.
Figure 13:
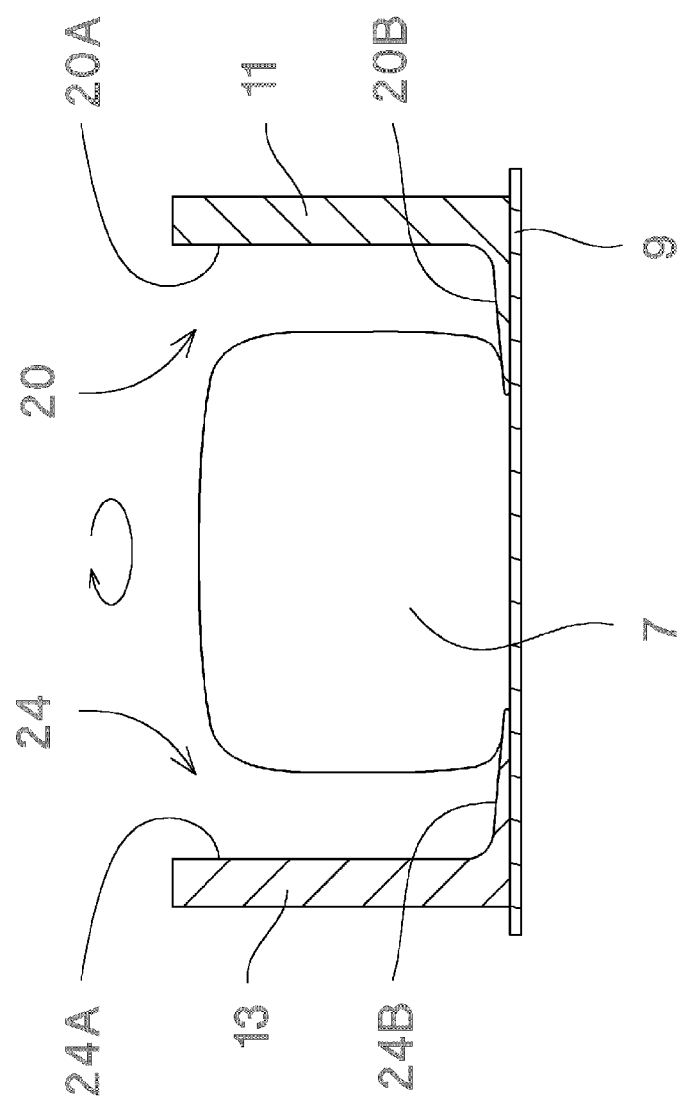
FIG. 13 is a drawing to illustrate the shape of the shaping section that is incorporated in the shaping plate of the third embodiment of the machine and the process for rounding dough of the present invention and as viewed along the arrow C-C in FIG. 12(B).
Figure 14:
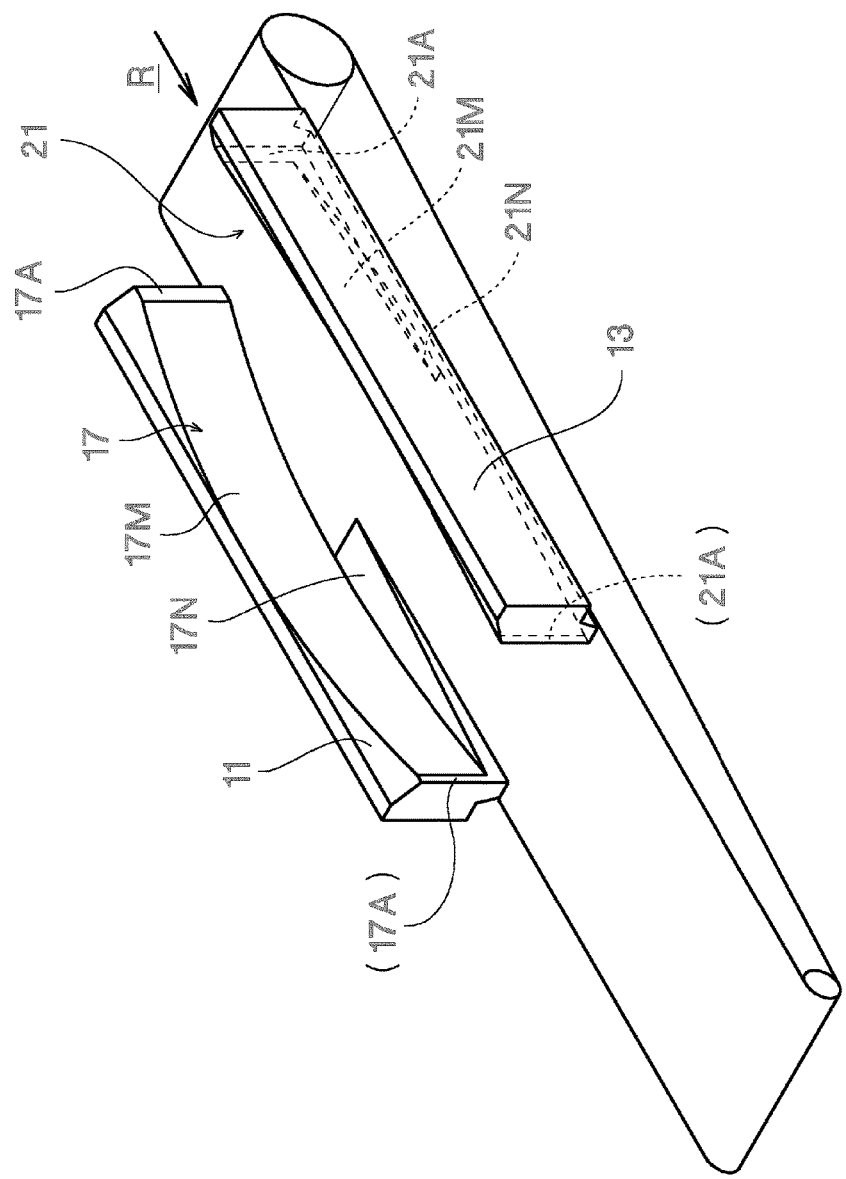
FIG. 14 is a drawing to illustrate the shape of the shaping section that is incorporated in the shaping plate of the fourth embodiment of the machine and the process for rounding dough of the present invention.

The rounding machine of the third embodiment of the present invention will now be explained in reference to FIGS. 12 and 13. The third embodiment of the present invention is configured to modify the numbers and the shapes of the shaping plates 11 and 13, as compared with the first embodiment. The same reference numbers refer to the same components of the rounding machine 1 of the first embodiment, and the detailed descriptions thereof are omitted. As shown in FIG. 10, in the second embodiment of the present invention, the dough-holding section 17 of the shaping plate 11 is provided with, along the longitudinal direction of the dough-holding section 17, the first dough-holding section 18 at the upstream side, the second dough-holding section 19 at substantially the center, and a third dough-holding section 20 at the downstream side. Because the shapes of the first dough-holding section 18 and the second dough-holding section 19 are the same as those of the first embodiment, the details thereof are omitted.

The third dough-holding section 20 is provided with a concave curve, from the inside toward the outside, and the third shaping face 20A. In particular, the third shaping face 20A is gradually and outwardly displaced from near the downstream end of the second dough-holding section 19 in the longitudinal direction. When the displaced third shaping face 20A has arrived at a position that is an arbitrary distance from the middle vertical plane, the third shaping face 20A is gradually and inwardly displaced so as to be connected to the downstream end of the shaping plate 11. The third dough-holding section 20 is also provided with a protruding section 20B. The protruding section 20B continuously protrudes from the lower end of the first shaping face 20A to the middle vertical plane. The protruding section 20B is flush with the vertical plane 17A. The upper surface of the protruding section 18B is inwardly (the side of the middle vertical plane) and downwardly inclined such that it is wider in the width direction and thinner in direction of the thickness, than those of the protruding section 18B of the first dough-holding section 18. The third dough-holding section may be configured to detachably attach to the shaping plate 11 that is provided with the first dough-holding section 18 and the second dough-holding section 19. In this case, the rounding machine in this embodiment can be made readily compatible with the rounding machine of the first embodiment.

Because the dough-holding section 21 of the shaping plate 13 is formed to be symmetrical with the dough-holding section 17 relative to the middle vertical plane, the details thereof are omitted. The dough-holding section 21 is provided with a vertical plane 21A corresponding to the vertical plane 17A, a first dough-holding section 22 corresponding to the first dough-holding section 18, a second dough-holding section 23 corresponding to the second dough-holding section 19, and a second dough-holding section corresponding to the third dough-holding section 20. The first dough-holding section 22 is provided with a first shaping face 22A corresponding to the first shaping face 18A, and a protruding section 22B corresponding to the protruding section 18A. The first shaping face 22A is subjected to a dimpling process 22C corresponding to the dimpling process 18C. The second dough-holding section 23 is provided with a second shaping face 23A corresponding to the second shaping face 19A and configured to have an incline corresponding to the incline thereof. The third dough-holding section 24 is provided with a third shaping face 24A corresponding to the second shaping face 20A and a protruding section 24B corresponding to the protruding section 20B of the second shaping face 20A.

Below the rounding processes for rounding the bread-dough piece 7 used with the rounding machine 1 will be explained. In the second embodiment, it will be explained that the rounding processes are performed at three locations where the bread-dough piece 7 is intermittently conveyed and stopped by the predetermined interval (pitch) on the belt conveyor 9. First, the bread-dough piece 7 is cut from substantially bar-like forming bread dough to a predetermined weight. The cut rectangular bread-dough piece 7 is supplied to the upstream side (the left side of FIG. 1) and conveyed a distance (pitch) that is set by the belt conveyor 9, and positioned between the forming plate 11 and the forming plate 13, which are stopped and caused to retract from each other. It is assumed that the three forming locations are the following: the upstream side is the first location, the center is the second location, and the downstream side is the third location.

Because the rounding process at the first and second locations are the same as those of the first embodiment, their detailed explanations are omitted. At the first location, the bread-dough piece 7 is rounded by the first dough-holding sections 18 and 22. After the rounding formations are repeated twice at the first location, the bread-dough piece 7, which is substantially formed as a circle, is conveyed by one pitch, and stopped at the second location, between the shaping plates 11 and 13. At the second location, the bread-dough piece 7 is wrapped, kneaded, and its shape is adjusted by the second dough-holding sections 19 and 23. After the rounding formations are also repeated twice at the second location, the bread-dough piece 7 is conveyed by one pitch, and stopped at the third location, between the shaping plates 11 and 13 (see FIG. 12).

At the third location the lower side end portion of the bread-dough piece 7 is formed by the third dough-holding sections 20 and 24. First, accompanied by the motion of approaching the forming plates 11 and 13, the concave curves of the third forming faces 20A and 24A contact the bread-dough piece 7. At this time, because the third forming faces 20A and 24A are concavely curved as described above, the bread-dough piece 7 is subjected to a pressure toward its center. The forming plates 11 and 13 then begin a translational movement along, for example, a substantial oval locus. Because the third forming faces 20A and 24A are retracted from each other, while they apply the pressure on the bread-dough piece 7 toward its center, the bread-dough piece 7 is rolled horizontally about its center axis. When the forming plates 11 and 13 are substantially and linearly moved opposite each other, along the longitudinal direction, the bread-dough piece 7 is rolled by the concave curve of the third forming faces 20A and 24A. Further, the forming plates 11 and 13 begin a translational movement toward a direction where they are retracted from each other. In the forming process described above, the lower end of the bread-dough piece 7 is flattened by means of the protruding sections 20B and 25B, mentioned above, of the third dough-holding sections such that the shape of the bread-dough piece 7 is trimmed. Thereafter, the second forming faces 20A and 24A are retracted from each other, to prompt a horizontal rolling motion of the bread-dough piece 7, so as to release the bread-dough piece 7.

As described above, the outward inclinations of the protruding sections 20B and 24B of the third dough-holding sections 20 and 24 are configured such that they are formed to be relatively wider in the width direction and thin in the direction of the thicker part. For this reason, the second dough-holding sections 19 and 23 form the side of the bread-dough piece 7, whereas the third dough-holding sections 20 and 24 can flatten the bread-dough piece 7 by entering the bottom face end (see FIG. 13). The bottom face end of the bread-dough piece 7 is formed and flattened such that the bread-dough piece 7 is rolled by means of the third dough-holding sections 20 and 24. Therefore, a product in which the bread-dough piece 7 with a naturally rounded end, which can be obtained in a manual forming process, can be obtained.

The fourth embodiment of the present invention is configured to modify the numbers and the shapes of the shaping plates 11 and 13, as compared with the first and second embodiments. The same reference numbers refer to the same components of the rounding machine 1 of the first embodiment, and so the detailed descriptions thereof are omitted.

The dough-holding section 17 of the forming plate 11 is provided with vertical faces 17A at the upstream end portion and the downstream end portion. The dough-holding section 17 of the forming plate 11 is also provided with a forming face 17M, which is concave and curved from inside the shaping plate 11 to the outside thereof, in the plan view.

Further, the dough-holding section 17 is provided with a protruding section 17N. The protruding section 17N is continuously projected from the lower end of the forming face 17M to the direction toward the middle vertical plane such that the end in the width direction of the protruding section 17N lies on the same plane of the vertical face 17A. Further, the longitudinal extent of the protruding section 17N runs from the downstream end of the forming face 17M to its substantial center position such that its end of the length is provided so that the substantial center position of the forming face 17M faces upstream. The upper surface of the protruding section 17N is inclined to its inside and to the substantial center position of the forming face 17M.

The dough-holding section 21 of the shaping plate 13 is formed to be symmetrical with respect to a point against the dough-holding section 17 across the middle vertical plane. Namely, the dough-holding section 21 of the forming plate 13 is provided with vertical surfaces 21A at the upstream end portion and the downstream portion. The dough-holding section 21 of the forming plate 13 is also provided with a forming face 21M, which is concave and curved from the inside of the forming plate 13 to the outside of it in a plane view. Also, the dough-holding section 21 is provided with a protruding section 21N. The protruding section 21N consequently protrudes from the end portion of the forming face 21M toward the middle vertical face such that its end portion of the width lies on the same plane of the vertical face 21A. Further, the longitudinal extent of the protruding section 21N extends from the upstream end of the forming face 21M to its substantial center position such that its end of the length is provided with substantially the center position of the forming face 17M, to face downstream. The upper surface of the protruding section 21N is inclined to its inside and to the substantial center position of the forming face 21M.

The bread-dough piece 7 is rounded and formed by means of the dough-holding sections 17 and 21. In this forming process, because the horizontal rolling of the bread-dough piece 7 due to the concave curve of the forming faces 17 and 21 is the same as that of the first and second embodiments, the detailed description thereof is omitted. Through the rounding process, because the rolling motion of the bread-dough piece 7 is facilitated in the horizontal direction, the entire circumference of the side-end portion of the bread-dough piece 7 is subjected to pressurized effects from the protruding sections 17N and 21N. Further, in at least the first half of the rounding process, because the protruding sections 17N and 21N are moved such that their ends of the lengths approach each other, this motion further facilitates the rolling motion of the bread dough-piece 7, as well as positional shifts along the longitudinal direction being able to be prevented. The protruding sections 17 and 21 are tucked down the entire circumference of the side-end portion of the bread dough-piece 7 to the lower surface thereof such that the winding end of the bottom of the bread dough-piece 7 can be continuously formed. The present embodiment has a beneficial effect where dough that has higher extensibility and elasticity relative to those of the envisioned artisan-bread dough in the first and second embodiments is formed by rounding by a requisite minimum number of rounding processes, without any damage.

Figure 15:
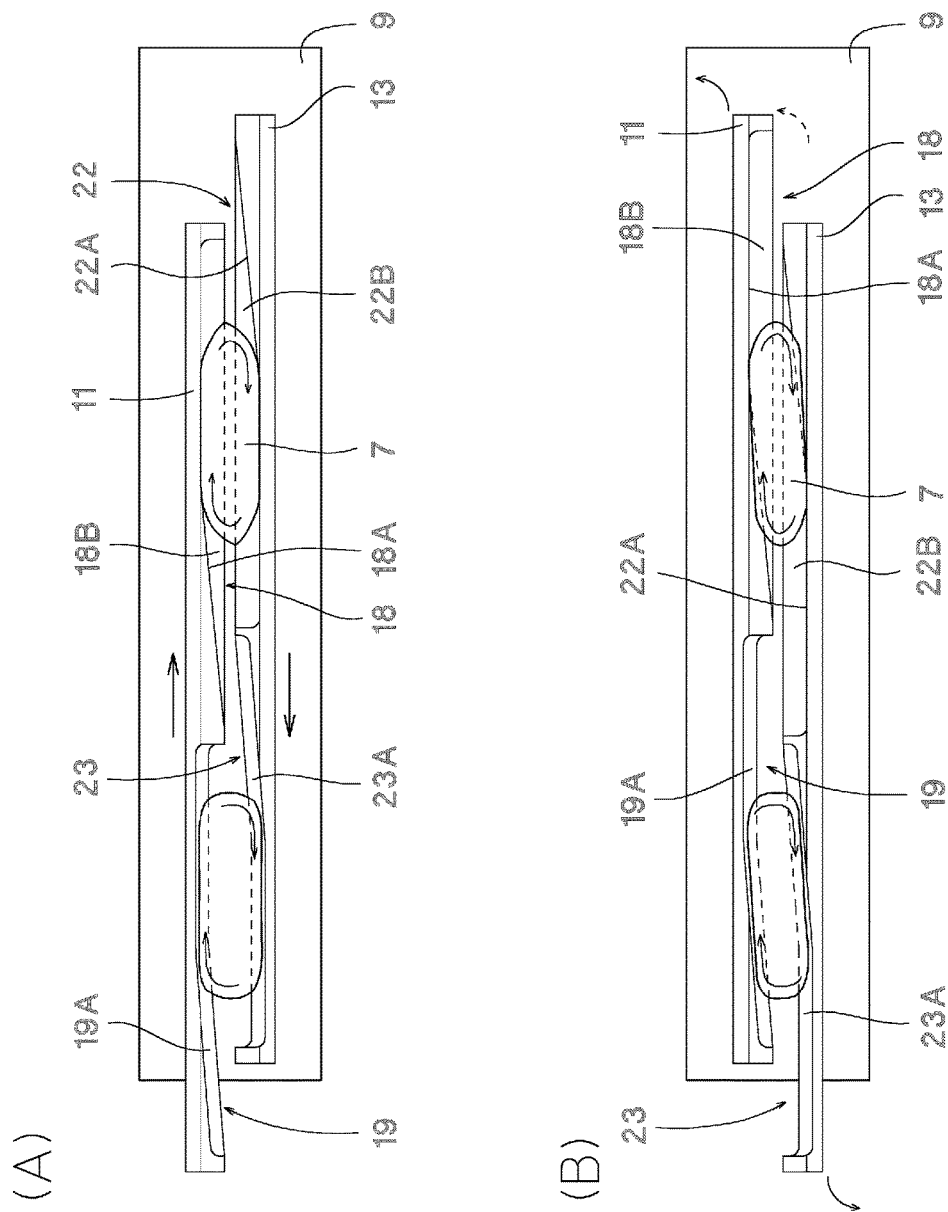
FIGS. 15(A) and (B) are plan views to illustrate the operation of the shaping section that is employed in conjunction with the rounding machine of another embodiment of the present invention.

Several embodiments of the present invention are described above. Nevertheless, it should be appreciated that various modifications can be made within the spirit and scope of the present invention. The curved shapes of the first forming faces 18A, 22A and the second forming faces 19A, 23 can be modified. For instance, in the embodiment as shown in FIG. 15, the first shaping face 18A on the forming plate 11 is gradually and outwardly shifted from the vertical face 17A at the upstream end toward the longitudinal direction, maintaining an arbitrary distance between the first shaping face 18A and the middle vertical plane, and is then connected to the vertical face 17A at the substantially center portion. The second shaping face 23A is outwardly shifted from the vertical face 17A toward the longitudinal direction, maintaining an arbitrary distance between the second shaping face 23A and the middle vertical plane, and is then connected to the vertical face 17A at the downstream end. The shaping plate 13 and the shaping plate 11 are formed to be symmetric with respect to a point. Even in such a configuration, the effect of facilitating the rolling of the bread dough-piece 7 as described above remains, and is unchanged. Further, on the forming face, if it only has a concave shape, a predetermined effect can be obtained. Therefore, a bent shape, for instance, a dog-leg shape in the plane view, may be employed instead of the concave shape. Further, depending on the degree of the rounding form to be required for a rounded bread-dough piece, a configuration in which at least one forming plate includes a concave forming face, while the opposite one includes a vertical forming face or the conventional inclined forming face, may be employed.

As an alternative, in the machine or the process of the present invention, both the shaping plate 11 and the shaping plate 13 do need to be driven, and an embodiment in which one shaping plate is fixed and the other shaping plate is moved relative to the fixed one may be possible. Of course, to enhance the effect of the rounding process, preferably both the shaping plate 11 and the shaping plate 13 are to be driven. However, depending on the desired degree of the rounding process, there is a case in which driving either the shaping plate 11 or the shaping plate 13 may suffice.

Although the above respective embodiments employ the bread-dough piece 7 as the food-dough piece, the present invention is not limited to it. The machine and the process of the present invention can be applied to any viscous food-dough piece, and are not limited to the bread-dough piece 7.

DENOTATIONS OF NUMBERS

1 Rounding machine
5 Rounding section
7 Food-dough piece
9 Conveyor
11 Shaping plate
13 Shaping plate
17 Dough-holding section
17A Vertical face
18 First dough-holding section
18A First forming face
18B Protruding section
18C Dimple
19 Second dough-holding section
19A Second shaping face
19A Side face
21 Dough-holding section
21A Vertical face
22 First dough-holding section
22A First shaping face
22B Protruding section
22C Dimple
23 Second dough-holding section
23A Second forming face

The invention claimed is:

1. A process of rounding food-dough pieces (7) by moving a pair of shaping plates (11, 13) along a moving locus, wherein the pair of shaping plates (11, 13) is arranged and extend along a conveying direction of the food-dough pieces (7) and wherein at least one of the shaping plates (11, 13) is provided with a concave forming face on the inside that is opposite another shaping plate, the process comprising the steps of:
   (a) laterally pressing and holding the food-dough pieces (7) on a conveying device (9) by causing the shaping plates (11, 13) to approach each other;
   (b) rounding the food-dough pieces (7) by moving the shaping plates (11, 13) opposite each other along the conveying direction during or after the approaching motions of the shaping plates (11, 13) take place;
   (c) releasing the food-dough pieces (7) by retracting the shaping plates (11, 13) from each other during or after the rounding process after the approaching motions of the shaping plates (11, 13) end; and
   (d) carrying out the above steps (a), (b), and (c) one or more times.

2. The process of claim 1, characterized in that in at least the step (b) the shaping face facilitates the horizontal rolling motion of the food-dough pieces (7).

3. The process of claim 1, characterized in that the pair of shaping plates (11, 13) are movable along a moving locus, wherein the moving locus has a longitudinal component in which the shaping plates (11, 13) are moved relatively in directions opposite to each other, along the conveying direction, and a width component in which the shaping plates (11, 13) move relatively to approach, and retract from, each other, along the widthwise direction perpendicular to the conveying direction, and wherein the moving stroke of the longitudinal component is longer than that of the width component when the food-dough pieces (7) are rounded.

* * * * *